US010652845B2

(12) United States Patent
Sheng et al.

(10) Patent No.: US 10,652,845 B2
(45) Date of Patent: May 12, 2020

(54) SYNCHRONIZATION FOR VEHICLE (V2X) COMMUNICATIONS

(71) Applicant: Sharp Kabushiki Kaisha, Sakai, Osaka OT (JP)

(72) Inventors: Jia Sheng, Vancouver, WA (US); John Michael Kowalski, Camas, WA (US); Toshizo Nogami, Vancouver, WA (US)

(73) Assignee: Sharp Kabushiki Kaisha, Sakai, Osaka (JP)

( * ) Notice: Subject to any disclaimer, the term of this patent is extended or adjusted under 35 U.S.C. 154(b) by 115 days.

(21) Appl. No.: 15/473,121

(22) Filed: Mar. 29, 2017

(65) Prior Publication Data

US 2017/0289934 A1    Oct. 5, 2017

Related U.S. Application Data

(60) Provisional application No. 62/315,641, filed on Mar. 30, 2016.

(51) Int. Cl.
*H04W 56/00* (2009.01)
*G01S 19/14* (2010.01)
*H04W 84/00* (2009.01)

(52) U.S. Cl.
CPC ......... *H04W 56/001* (2013.01); *G01S 19/14* (2013.01); *H04W 56/002* (2013.01); *H04W 56/0015* (2013.01); *H04W 84/005* (2013.01)

(58) Field of Classification Search
CPC .............................. H04W 56/001; G01S 19/14
See application file for complete search history.

(56) References Cited

U.S. PATENT DOCUMENTS

| 2012/0209519 A1 | 8/2012 | Basnayake |
| 2015/0215903 A1 | 7/2015 | Zhao et al. |
| 2016/0044618 A1 | 2/2016 | Sheng et al. |

FOREIGN PATENT DOCUMENTS

| EP | 3 322 233 A1 | 5/2018 |
| EP | 3 404 971 A1 | 11/2018 |
| EP | 3 410 792 A1 | 12/2018 |

OTHER PUBLICATIONS

3GPP TSG RAN Meeting #68, RP-151109, LG Electronics, CATT, Bodafone, Huawei, "New SI Proposal: Feasibility Study on LTE-Based V2X Services", Malmö, Sweden, Jun. 15-18, 2015.
3GPP TSG RAN Meeting #70, RP-152293, LG Electronics, Huawei, HiSilicon, CATT, CATR, "New WI Proposal: Support for V2V Services Based on LTE Sidelink", Sitges, Spain, Dec. 7-10, 2015.
3GPP TSG-RAN WG1 #86b, R1-1610152, Qualcomm Incorporated, "Views on DL DMRS", Lisbon, Portugal, Oct. 10-14, 2016.
3GPP TSG RAN WG1 Meeting #84, R1-160734, Huawei, HiSilicon, "Timing Alignment of Different Synchronization Sources for V2V", St. Julian's, Malta, Feb. 15-19, 2016.

(Continued)

*Primary Examiner* — Zhensheng Zhang
(74) *Attorney, Agent, or Firm* — Nixon & Vanderhye P.C.

(57) ABSTRACT

A wireless terminal comprises sidelink controlling circuitry and transmitting circuitry. The sidelink controlling circuitry is configured to select a reference source. The transmitting circuitry is configured to transmit sidelink synchronization signal (SLSS) based on the reference source. In a case that a timing reference is Global Navigation Satellite System (GNSS) and the GNSS is reliable according to a comparison with a threshold value, the sidelink controlling circuitry is configured to select GNSS as the reference source.

2 Claims, 25 Drawing Sheets

(56) References Cited

OTHER PUBLICATIONS

3GPP TSG RAN WG1 Meeting #84, R1-160758, Huawei, HiSilicon, "SLSS and PSBCH Design for V2V", St. Julian's, Malta, Feb. 15-19, 2016.
3GPP TSG RAN WG1 #83, R1-160577, Samsung, "Discussion on Synchronization for PC5 Based V2V", Anaheim, USA, Nov. 15-22, 2015.
3GPP TSG RAN WG1 Meeting #84, R1-160360, CATT, "Synchronization Enhancements in PC5-Based V2V", St. Julian's, Malta, Feb. 15-19, 2016.
3GPP TSG RAN WG1 Meeting #86bis, R1-161072, CMCC, ZTE, ZTE Microelectronics, CATT, Xinwei, "WF on CSI Feedback Framework for Hybrid Beamforming in NR", Lisbon, Portugal, Oct. 10-14, 2016.
3GPP TR 22.885 V1.0.0, Technical Report, $3^{rd}$ Generation Partnership Project; Technical Specification Group Services and System Aspects; Study on LTE Support for V2X Services (Release 14) (Sep. 2015).
3GPP TR 22.885 V14.0.0, Technical Report, $3^{rd}$ Generation Partnership Project; Technical Specification Group Services and System Aspects; Study on LTE Support for V2X Services (Release 14) (Dec. 2015).
3GPP TS 36.304 V13.0.0, Technical Specification, $3^{rd}$ Generation Partnership Project; Technical Specification Group Radio Access Network; Evolved Universal Terrestrial Radio Access (E-UTRA); User Equipment (UE) procedures in idle mode (Release 13) (Dec. 2015).
3GPP TS 36.211 V13.5.0, Technical Specification, $3^{rd}$ Generation Partnership Project; Technical Specification Group Radio Access Network; Evolved Universal Terrestrial Radio Access (E-UTRA); Physical channels and modulation (Release 13) (Mar. 2017).
3GPP TS 36.133 V13.7.0, Technical Specification, $3^{rd}$ Generation Partnership Project; Technical Specification Group Radio Access Network; Evolved Universal Terrestrial Radio Access (E-UTRA); Requirements for support of radio resource management (Release 13) (Mar. 2017).
3GPP TS 36.331 V13.0.0, Technical Specification, $3^{rd}$ Generation Partnership Project; Technical Specification Group Radio Access Network; Evolved Universal Terrestrial Radio Access (E-UTRA); Radio Resource Control (RRC); Protocol specification (Release 13) (Dec. 2015).
International Preliminary Report on Patentability dated Oct. 11, 2018 in PCT application PCT/US2017/024763.
International Search Report and Written Opinion dated Jun. 12, 2017 in PCT Application No. PCT/US17/24763.
R1-161052, 3GPP TSG RAN WG1 Meeting #84, NTT DOCOMO, "SLSS Enhancements for GNSS based Synchronization", St. Julian's, Malta, Feb. 15-19, 2016.
R1-162643, 3GPP TSG RAN WG1 Meeting #84bis, Huawei, HiSilicon, "Discussion on open issues for synchronization", Busan, Korea, Apr. 11-15, 2016.
Supplemental EP Search Report dated Oct. 16, 2019 in EP Application No. 17776554.2.

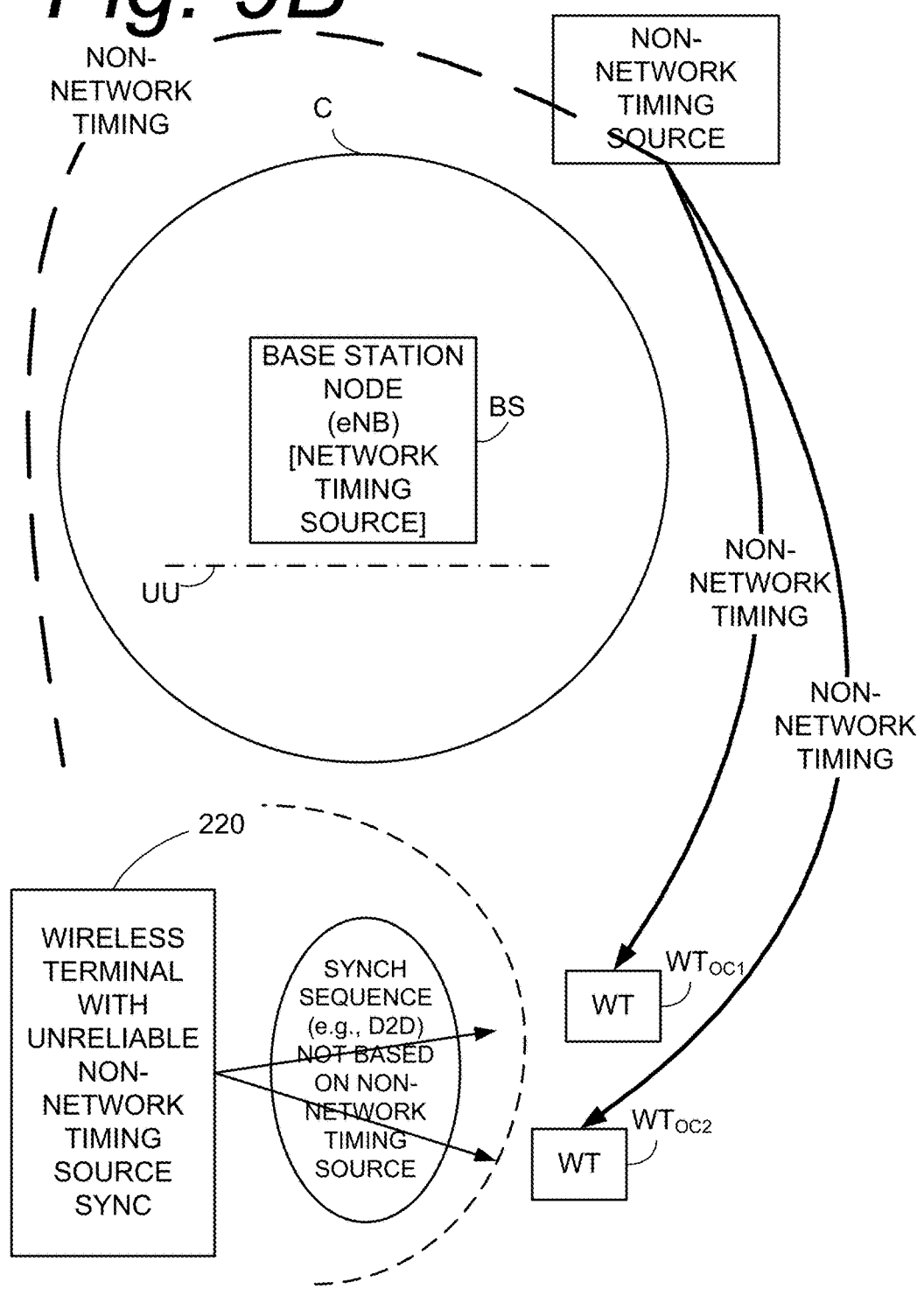

SYNCHRONIZATION FOR VEHICLE (V2X) COMMUNICATIONS

This application claims the priority and benefit of U.S. Provisional Patent Application 62/315,641, filed Mar. 30, 2016, entitled "SYNCHRONIZATION FOR VEHICLE (V2X) COMMUNICATIONS", which is incorporated herein by reference in its entirety.

TECHNICAL FIELD

The technology relates to wireless communications, and particularly to synchronization of vehicle (V2X) communications.

BACKGROUND

When two user equipment terminals (e.g., mobile communication devices) of a cellular network or other telecommunication system communicate with each other, their data path typically goes through the operator network. The data path through the network may include base stations and/or gateways. If the devices are in close proximity with each other, their data path may be routed locally through a local base station. In general, communications between a network node such as a base station and a wireless terminal is known as "WAN" or "Cellular communication".

It is also possible for two user equipment terminals in close proximity to each other to establish a direct link without the need to go through a base station. Telecommunications systems may use or enable device-to-device ("D2D") communication, in which two or more user equipment terminals directly communicate with one another. In D2D communication, voice and data traffic (referred to herein as "communication signals" or "communications") from one user equipment terminal to one or more other user equipment terminals may not be communicated through a base station or other network control device of a telecommunication system. "Device-to-device ("D2D") communication may also be known as "sidelink direct" communication (e.g., sidelink communication), or even as "sidelink", "SL", or "SLD" communication.

D2D or sidelink direct communication can be used in networks implemented according to any suitable telecommunications standard. A non-limiting example of such a standard is the 3rd Generation Partnership Project ("3GPP") Long Term Evolution ("LTE"). The 3GPP standard is a collaboration agreement that aims to define globally applicable technical specifications and technical reports for third and fourth generation wireless communication systems. The 3GPP may define specifications for next generation mobile networks, systems, and devices.

Currently 3GPP is specifying a new feature for Rel-14 that covers use cases and potential requirements for LTE support for vehicular communications services (represented by the term, Vehicle-to-Everything (V2X) Services). The feature is documented in the TR 22.885 on LTE Study on LTE Support for V2X Services. Contemplated V2X services may include one or more of the following:

V2V: covering LTE-based communication between vehicles.

V2P: covering LTE-based communication between a vehicle and a device carried by an individual (e.g. handheld terminal carried by a pedestrian, cyclist, driver or passenger).

V2I: covering LTE-based communication between a vehicle and a roadside unit. A roadside unit (RSU) is a transportation infrastructure entity (e.g. an entity transmitting speed notifications).

Thus far 3GPP deliberations concerning synchronization for vehicle-to-vehicle (V2V) communications have essentially assumed reuse of LTE sidelink for V2V, e.g., assumed that the V2V communications will essentially be indistinct from sidelink direct communications in the access stratum (AS), e.g., may use the same PC5 radio access interface. As such, it has generally been assumed that the LTE 3GPP Rel-12 and Rel-13 D2D synchronization design for SLD would be reused as much as possible. On the other hand, there are still numerous differences between V2X and D2D, such as higher V2X user equipment (UE) density and much higher V2X UE velocity.

In D2D sidelink communications, when a UE is within E-UTRAN coverage, a base station (e.g, eNB) may instruct a UE to become a synchronization source to transmit a sidelink direct synchronization signal (SLSS). On the other hand, if there is no eNB configuration, the UE may by itself become a synchronization source to transmit SLSS once the measured RSRP of the cell is below some pre-configured threshold. On the other hand, when a SLD UE is out-of-coverage, if the received signals from another UE are below some pre-configured S-RSRP threshold, the UE can by itself become a synchronization source to transmit SLSS as well With the advent of GNSS (Global Navigation Satellite System) and GNSS-equivalent timing sources), a UE participating in V2X communications may be synchronized to GNSS timing even when being outside of E-UTRAN coverage if the GNSS signal received by the UE is sufficiently reliable enough. Meanwhile, given the fact that generally UEs in V2X communication have much higher density than SLD UEs, it is important to control V2X synchronization signal transmission so as to avoid occupying too many resources and generating too much interference. Further, whether the velocity of the UE may affect synchronization signal transmission. Moreover, since in at least some contemplate implementations the V2X will also use the same (SLD) PC5 interface for communications, e.g., coexisting D2D and V2X synchronization signal transmission, handling both D2D synchronization signals and V2X synchronization signals may be problematic.

What is needed are methods, apparatus, and/or techniques for controlling synchronization in vehicle (V2X) communications.

SUMMARY

As one of its aspects, the technology disclosed herein concerns a wireless terminal configured for use in vehicle (V2X) communications. The wireless terminal comprises a receiver, processor circuitry, and a transmitter. The receiver is configured to receive a timing signal from a timing source. The processor circuitry configured to obtain a synchronization reliability factor; make a comparison of the synchronization reliability factor with a threshold value; and use a result of the comparison to make a determination whether to permit transmission of a synchronization signal based on the received timing signal. The transmitter is configured, when permitted in accordance with the determination, to transmit the synchronization signal over a frequency used for vehicle (V2X) communications.

In another of its example aspects, the technology disclosed herein concerns a wireless terminal (UE) and method of operating same. The wireless terminal comprises sidelink controlling circuitry and transmitting circuitry. The sidelink controlling circuitry is configured to select a reference source. The transmitting circuitry is configured to transmit sidelink synchronization signal (SLSS) based on the reference source. In a case that a timing reference is Global Navigation Satellite System (GNSS) and the GNSS is reliable according to a comparison with a threshold value, the sidelink controlling circuitry is configured to select GNSS as the reference source.

An example method of operating the wireless terminal comprises selecting a reference resource; and transmitting sidelink synchronization signal (SLSS) based on the reference source. In a case that a timing reference is Global Navigation Satellite System (GNSS) and the GNSS is reliable according to a comparison with a threshold value, the method comprises selecting GNSS as the reference source In another of its aspects the technology disclosed herein concerns wireless terminal configured for use in vehicle (V2X) communications comprising receiver circuitry; processor circuitry, and a transmitter. The receiver circuitry is configured to receive: a first synchronization signal based on a first timing source which is available throughout a cellular radio access network but maintained external to the cellular radio access network, and a second synchronization signal based on a second timing source maintained by the cellular radio access network. The processor circuitry is configured to make a selection between the first timing source and the second timing source. If the selection is the second timing source, the processor circuitry permits transmission from the wireless terminal of a synchronization sequence based on the second timing source. If the selection is the first timing source, the processor circuitry does not permit transmission of a synchronization sequence. The transmitter is configured, when permitted, to transmit the synchronization sequence based on the second timing source for use in vehicle (V2X) communications.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 9A and FIG. 9B are diagrammatic views of an out-of-network coverage wireless terminal attempts to act as a synchronization source for vehicle (V2X) communications, with FIG. 9A showing the out-of-network coverage wireless terminal having reliable synchronization with a non-network timing source and FIG. 9B showing the out-of-network coverage wireless terminal not having reliable synchronization with a non-network timing source.

DETAILED DESCRIPTION

Figure 1:
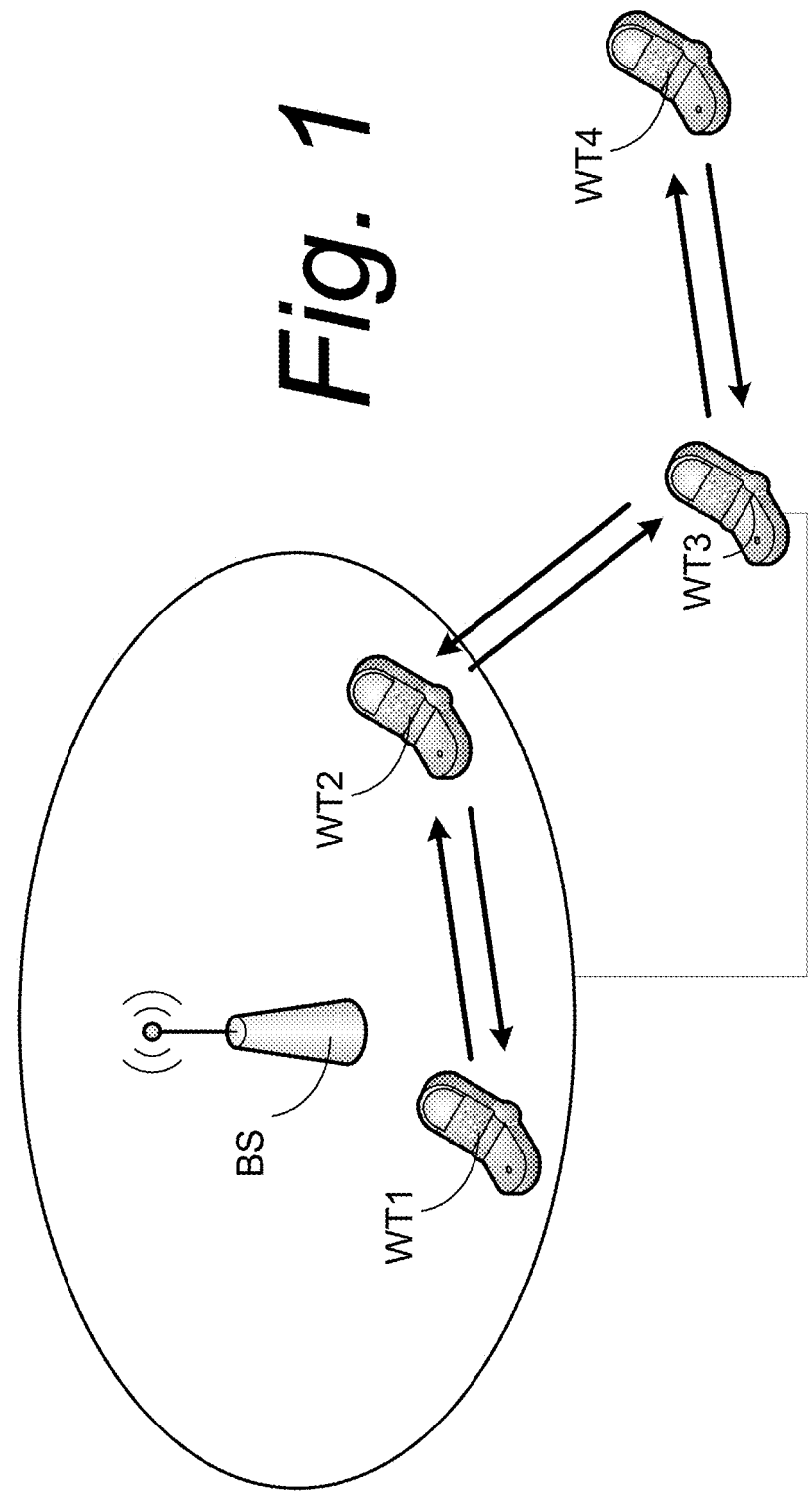
FIG. 1 is a diagrammatic view showing generally three scenarios which may occur in vehicle (V2X) communication, i.e., an in coverage vehicle (V2X) communication scenario; a partial coverage vehicle (V2X) communication scenario; and an out-of-coverage vehicle (V2X) communication scenario.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "device-to-device ("D2D") communication" may refer to a mode of communication between or among wireless terminals that operate on a cellular network or other telecommunications system in which the communication data traffic from one wireless terminal to another wireless terminal does not pass through a centralized base station or other device in the cellular network or other telecommunications system. The "device-to-device (D2D) communication" encompasses one or both of D2D signaling (e.g., D2D control information) and D2D data. "Device-to-device ("D2D") communication may also be known as "sidelink direct" communication (e.g., sidelink communication). The term "sidelink direct" may also be shortened to "sidelink", abbreviated as "SL", and as such "sidelink" may be used herein to refer to sidelink direct. Yet further, the term "ProSe" (Proximity Services) direct communication may be used in lieu of sidelink direct communication or device-to-device (D2D) communication. Therefore, it is to be understood that herein the terms "sidelink direct", 'sidelink" (SL), "ProSe" and "device-to-device (D2D)" may be interchangeable and synonymous.

Thus, as mentioned above, device-to-device (D2D) or sidelink direct communication differs from "WAN" or "Cellular communication" which is or involves communication between the base station and the wireless terminal. In device-to-device (D2D) communication, communication data is sent using communication signals and can include voice communications or data communications intended for consumption by a user of a wireless terminal. Communication signals may be transmitted directly from a first wireless terminal to a second wireless terminal via D2D communication. In various aspects, all, some or none of the control signaling related to the D2D packet transmission may be managed or generated by the underlying core network or base station. In additional or alternative aspects, a receiver user equipment terminal may relay communication data traffic between a transmitter user equipment terminal and one or more additional receiver user equipment terminals.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, 12, and thereafter), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

Vehicle (V2X) communication is described in one or more of the following (all of which are incorporated herein by reference in their entirety):
RP-151109, Feasibility Study on LTE-based V2X Services
RP-152293, Support for V2V services based on LTE sidelink
R1-161072, Distributed Synchronization Procedure for V2X over PC5, Ericsson
R1-160734, Timing Alignment of Different Synchronization Sources for V2V, Huawei
R1-160758, SLSS and PSBCH Design for V2V, Huawei
R1-1610152, SLSS Enhancement for GNSS Based Synchronization, NTT Docomo
R1-160577, Discussions on synchronization for PC5 based V2V, Samsung
R1-160360, Synchronization enhancements in PC5-based V2V, CATT
3GPP TR 22.885 V0.4.0 3rd Generation Partnership Project; Technical Specification Group Services and System Aspects; Study on LTE Support for V2X Services (Release 14)

Also incorporated herein by reference are the most recent versions of Release 13 of each of the following 3GPP Technical Specifications:
3GPP Technical Specification 36.304, "Evolved Universal Terrestrial Radio Access (E-UTRA); User Equipment (UE) procedures in idle mode";
3GPP TS 36.211 "Evolved Universal Terrestrial Radio Access (E-UTRA); Physical channels and modulation";
3GPP TS 36.133 "Evolved Universal Terrestrial Radio Access (E-UTRA); Requirements for support of radio resource management";
3GPP TS 36.331 "Evolved Universal Terrestrial Radio Access (E-UTRA); Radio Resource Control (RRC); Protocol specification"

Vehicle (V2X) communication is a communication that involves a radio connection established between a transmit device and a receive device (e.g., a wireless terminal or UE), which radio communication need not transit via a base station node of the network, with at least of one the transmit device and the receive device being mobile, e.g., capable of being moved. Generic V2X encompasses one or more of vehicle to infrastructure (V2I) communication; vehicle to person/pedestrian (V2P) communication; and vehicle to vehicle (V2V) communication. Generally, there are three general scenarios which may occur in vehicle (V2X) communication. Those three general vehicle (V2X) communications scenarios are illustrated in FIG. 1. A first vehicle (V2X) communication scenario is an "in coverage" vehicle (V2X) communication scenario, illustrated between WT1 and WT2 of FIG. 1, in which both WT1 and WT2 are within coverage of the cellular radio access network. A second vehicle (V2X) communication scenario is a "partial coverage" scenario, illustrated between WT2 and WT3 of FIG. 1. In the "partial coverage" vehicle (V2X) communication scenario the wireless terminal WT2 is within coverage of the cellular radio access network, but the wireless terminal WT3 is out-of-coverage of the cellular radio access network. A third vehicle (V2X) communication scenario is an "out-of-coverage" scenario, illustrated between wireless terminal WT3 and wireless terminal WT4 of FIG. 1. In the out-of-coverage vehicle (V2X) communication scenario both the wireless terminal WT3 and the wireless terminal WT4 are out-of-coverage of the cellular radio access network.

The three vehicle (V2X) communication scenarios are described with reference to whether or not a participating wireless terminals (e.g., WTs) are "in coverage" or "out-of-coverage" of one or more cellular radio access networks (which may collectively be referred to as a "cellular radio access network"). For sake of simplicity FIG. 1 depicts "coverage" as being with respect to an access node BS such as eNodeB which comprises a cellular radio access network. It should be understood, however, that a wireless terminal may also be in coverage of the cellular radio access network when served by any cell of the cellular radio access network(s). For example, if wireless terminal WT1 and wireless terminal WT2 were served by different cells, when participating in vehicle (V2X) communication the wireless terminal WT1 and wireless terminal WT2 would still be in an in coverage vehicle (V2X) communication scenario.

Figure 2:
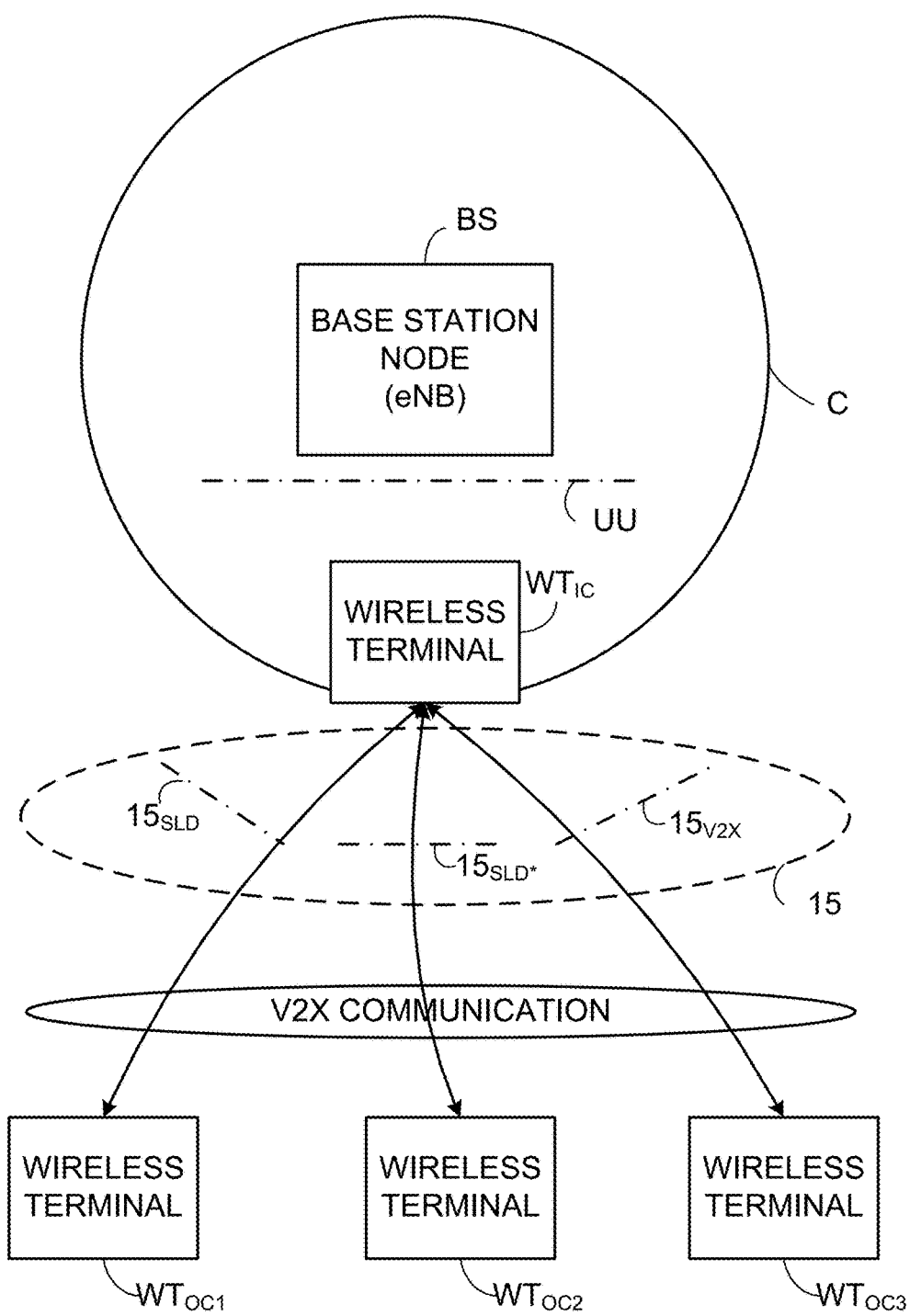
FIG. 2 is a diagrammatic view showing that, in differing implementations, V2X communication may be implemented either in conjunction with sidelink direct (SLD) communication, in conjunction with enhanced SLD, or apart from SLD as a separate V2X communication protocol.

As used herein and as illustrated in FIG. 2, V2X communication may be implemented in several ways. For illustrative context, FIG. 2 illustrates a base station node BS of a cellular radio access network which serves a cell C. The base station BS may communicate with a wireless terminal $WT_{IC}$ which is in coverage of the cellular radio access network over a radio interface UU. FIG. 2 further shows that wireless terminal $WT_{IC}$ may engage in vehicle (V2X) communication with one or more other wireless terminals which are outside of coverage of the cellular radio access network, particularly wireless terminal $WT_{OC1}$, wireless terminal $WT_{OC2}$, and wireless terminal $WT_{OC3}$. It is assumed that either wireless terminal $WT_{IC}$, or all of wireless terminal $WT_{OC1}$, wireless terminal $WT_{OC2}$, and wireless terminal WT$_{OC3}$ are mobile terminals for the communication to be vehicle (V2X) communication. Being "mobile" means that the wireless terminal is provided or situated in/with a mobile entity, such as a vehicle or a person.

As a first example implementation, V2X communication may be implemented using applications and resources of the type that were utilized for sidelink direct (SLD) communication (also known as device-to-device ("D2D") communication) before introduction of vehicle (V2X) communication. For example, when implemented as part of SLD communication the V2X communication may use resources and channels of the SLD communication scheme. In such first implementation the V2X communication may be said to be implemented using pre-V2X sidelink direct (SLD) protocol and over a pre-V2X sidelink direct (SLD) radio interface 15SLD.

As a second example implementation, V2X communication may be implemented using enhanced applications and enhanced resources utilized for sidelink direct (SLD) communication, e.g., sidelink direct communications augmented or enhanced with additional capabilities to accommodate vehicle (V2X) communication. In such second implementation the V2X communication may be said to be implemented using enhanced sidelink direct (SLD) protocol and over an enhanced sidelink direct (SLD) radio interface 15SLD*.

As a third example implementation, V2X communication may operate separately from sidelink direct (SLD) communication by, e.g., having separate and dedicated V2X communication resources and channels, and by being performed using application software which is specific to V2X communication. In such third implementation the V2X communication may be said to be implemented using separate vehicle (V2X) communications protocol and over a separate vehicle (V2X) communication radio interface 15V2X.

The fact that three example implementations are illustrated in FIG. 2 does not mean that a particular wireless terminal has to participate in all three or even two of the example implementations. FIG. 2 simply indicates the expansive meaning of the term vehicle (V2X) communication and that the technology disclosed herein encompasses vehicle (V2X) communication in all of its various existing and potential implementations.

Figure 3A:
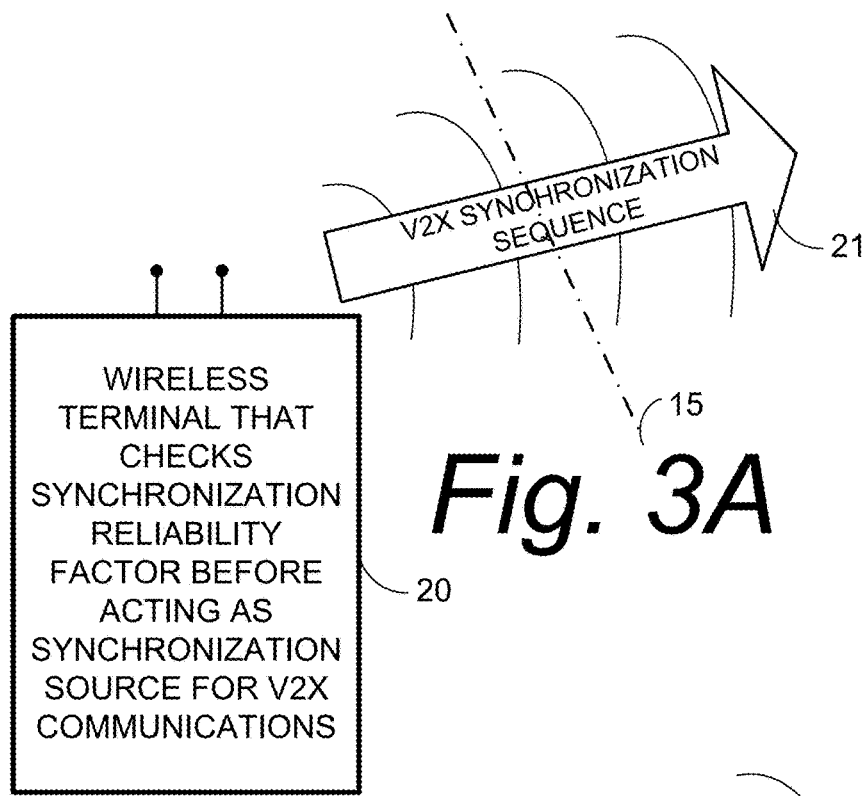
FIG. 3A is a diagrammatic view of a generic wireless terminal configured to check a synchronization reliability factor before acting as a synchronization source for vehicle (V2X) communications.
Figure 3B:
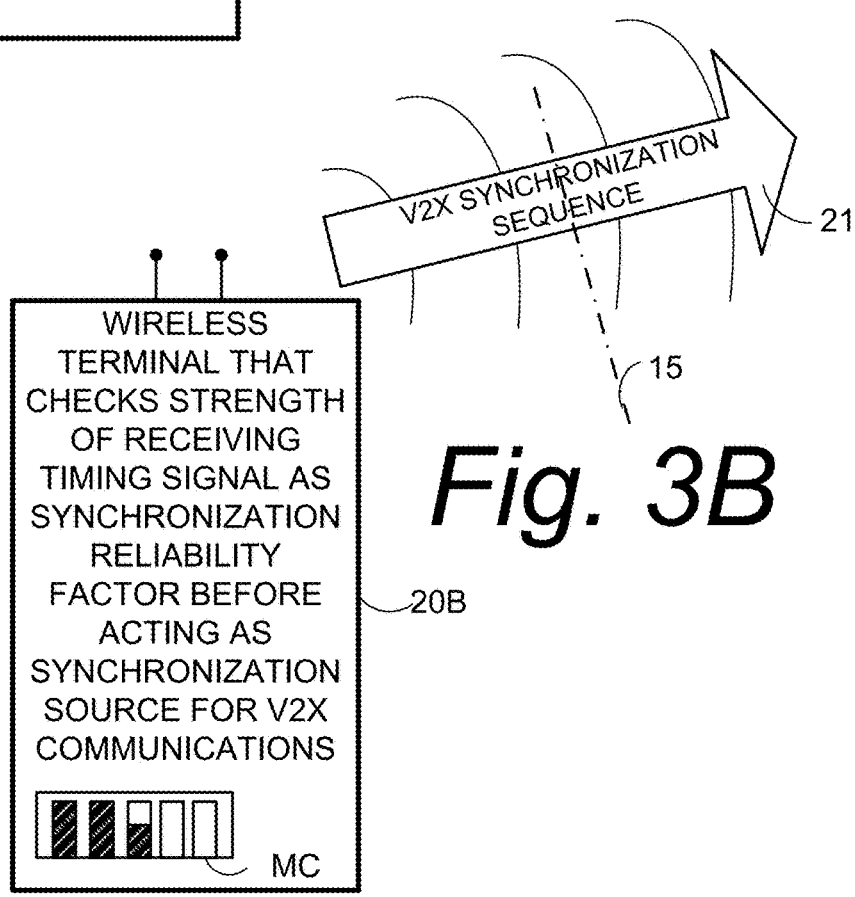
FIG. 3B is a diagrammatic view of a wireless terminal configured to check wireless terminal battery power as the synchronization reliability factor before acting as a synchronization source for vehicle (V2X) communications.

One aspect of the technology disclosed herein concerns apparatus, method, and technique for enhancing synchronization reliability for vehicle (V2X) communications. FIG. 3A generically illustrates wireless terminal 20 being configured to check a synchronization reliability factor before acting as a synchronization source for vehicle (V2X) communications, e.g., before transmitting synchronization sequence 21. As used herein, "synchronization reliability factor" comprises any value, parameter or operation condition that affects reliability of a synchronization signal or timing signal received by a wireless terminal. A first example of synchronization reliability factor is illustrated by FIG. 3B, wherein terminal 20B is configured to check the strength of a received timing signal (e.g., as diagrammatically depicted by signal strength measurement monitor RSRP) as the synchronization reliability factor before the wireless terminal 20B can act as a synchronization source for vehicle (V2X) communications. Use of received signal strength as the synchronization reliability factor applies regardless of the nature of the entity from which the received signal is transmitted. For example, the received signal for FIG. 3B may be from a non-cellular radio access network timing source, or from a device of a cellular radio access network (whether such devices is using network timing or its own timing or timing derived from a non-cellular radio access network timing source), or (e.g., directly) from a non-cellular radio access network timing source.

Figure 3C:
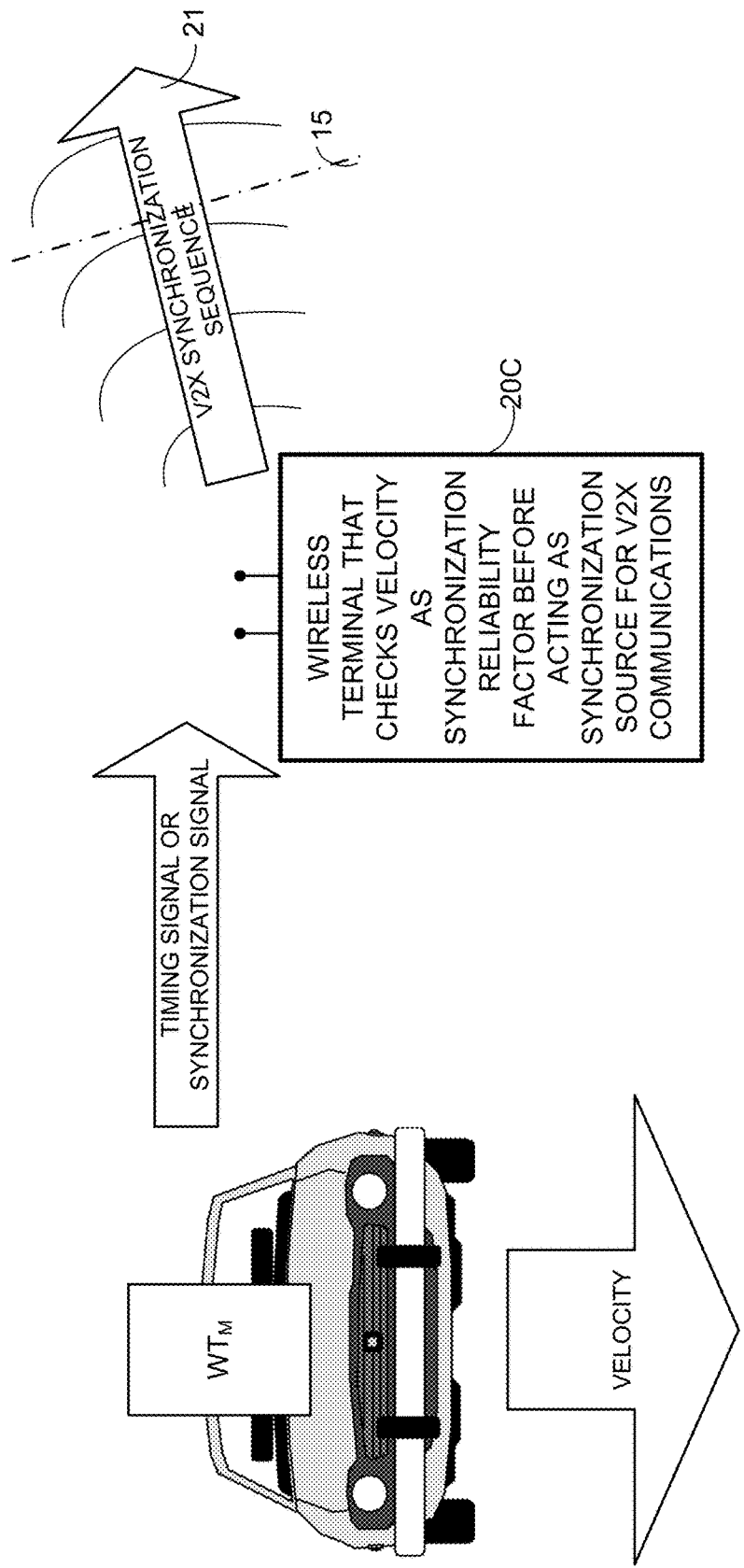
FIG. 3C is a diagrammatic view of a wireless terminal configured to check wireless terminal velocity as the synchronization reliability factor before acting as a synchronization source for vehicle (V2X) communications.

As another example, FIG. 3C illustrates wireless terminal 20C configured to check the velocity of an entity from which it receives a timing signal or synchronization signal as the synchronization reliability factor before acting as a synchronization source for vehicle (V2X) communications. In the illustration of FIG. 3C, the entity from which the wireless terminal 20C receives its timing signal or synchronization signal is a wireless terminal (WT$_M$) carried by a mobile vehicle. In the FIG. 3C situation, for example, if the wireless terminal 20C determines that a timing source from which it receives a timing signal or synchronization signal (e.g., wireless terminal WT$_M$) is travelling too fast for a synchronization signal generated therefrom to be reliable, the wireless terminal 20C does not serve as a synchronization source. The example scenario of FIG. 3C, e.g., use of velocity as synchronization reliability factor, applies so long as synchronization signal or timing signal is not directly received from a non-cellular radio access network timing source such as a satellite system in which the timing source is relatively static to the earth and thus to the receiving wireless terminal.

Figure 4A:
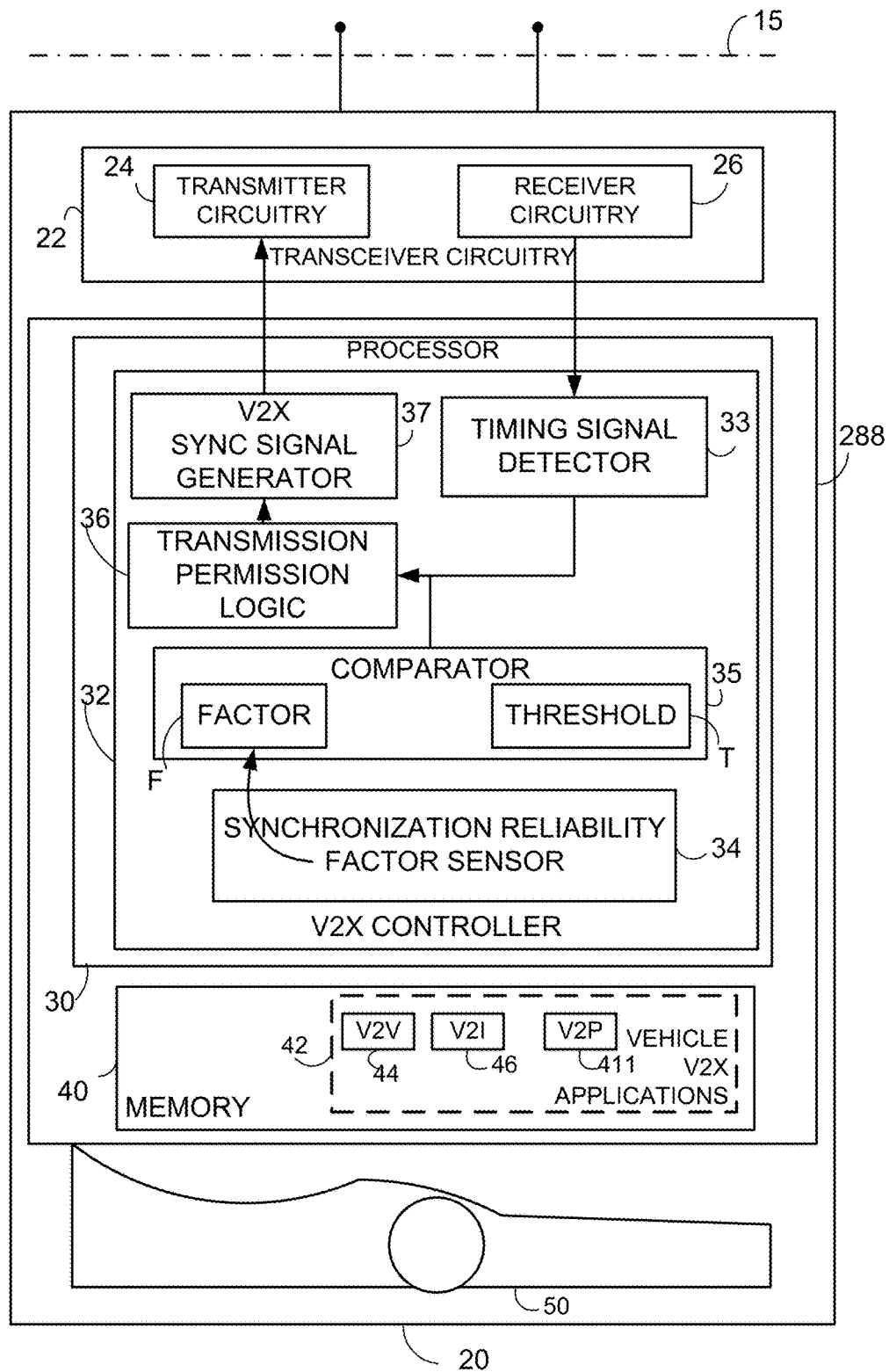
FIG. 4A is a schematic view of an example embodiment of a generic wireless terminal suitable configured to check a synchronization reliability factor before acting as a synchronization source for vehicle (V2X) communications.

FIG. 4A shows various example, representative, non-limiting components and functionalities herein pertinent to a generic wireless terminal 20 configured to check a synchronization reliability factor before acting as a synchronization source for vehicle (V2X) communications. The wireless terminal 20 comprises transceiver circuitry 22, which in turn comprises transmitter circuitry 24 and receiver circuitry 26. The transceiver circuitry 22 includes antenna(e) for the wireless terminal 20. Transmitter circuitry 24 includes, e.g., a frame generator, amplifier(s), modulation circuitry and other conventional transmission equipment. Receiver circuitry 26 comprises, e.g., demodulation circuitry, a frame deformatter, and other conventional receiver equipment. The transceiver circuitry 22 is configured to use resources allocated for V2X communication, whether those resources be shared with sidelink direct (SLD) communications or separate and distinct for V2X communication as previously described.

The wireless terminal 20 further comprises processor circuitry, also herein known more simply as processor 30. While processor 30 may have responsibility for operation of many aspects of wireless terminal 20 not specifically described herein, in one of its aspects processor 30 serves as a VCX controller 32 for controlling aspects of vehicle (V2X) communication. As further illustrated in FIG. 4A, the synchronization controller 32 in turn comprises timing signal detector 33; synchronization reliability factor sensor 34; comparator 35; transmission permission logic 36; and V2X synchronization signal generator 37.

In addition to the processor circuitry 30, wireless terminal 20 also comprises memory 40 (e.g., memory circuitry) which may store an operating system and various application programs, such as vehicle (V2X) communication applications 44 (including V2I application 46, V2V (vehicle-to-vehicle) application 47 and V2P (vehicle-to-pedestrian) application 48, discussed above. The memory 40 may be any suitable type of memory, e.g., random access memory (RAM), read only memory (ROM), cache memory, processor register memory, or any combination of one or more memory types. The applications such as V2X applications 44 comprise instructions executable by processor circuitry 30 and are stored in non-transient portions of memory 40.

The wireless terminal 20 further comprises user interface(s) 50. The user interfaces 50 may comprise one or more suitable input/output devices which are operable by a user. Some of all of the user interfaces 50 may be realized by a touch sensitive screen. The user interface(s) 50 may also comprise a keyboard, audio input and output, and other user I/O devices. Only a portion of the user interfaces 50 is depicted in FIG. 4A, it being understood that the user interfaces 50 may be provided on a cover or case of wireless terminal 50 and thus may visibly obscure the underlying other components shown in FIG. 4A.

The receiver circuitry 26 of wireless terminal 20 is configured to receive a timing signal from a timing source. The timing source could be any of several types. As a first example, the timing source may be a network timing source, e.g., from a time maintained by a device of a cellular radio access network. As a second example, the timing source may be a "non-cellular radio access network source". As used herein a "non-cellular radio access network source" is a timing source which is available throughout a cellular radio access network but maintained external to the cellular radio access network (in contrast to a timing source that is maintained by the cellular radio access network). An example of a "non-cellular radio access network source" is a Global Navigation Satellite System (GNSS)-type timing source, such as GPS, GLONASS, Galileo or Beidou systems. Another example of a "non-cellular radio access network source" is an atomic clock type source that is available throughout the cellular radio access network. As a third example, the timing source may be an independent timing source, e.g., a device of a cellular radio access network such as wireless terminal which does not derive it timing from either the cellular radio access network or a non-cellular radio access network source, but from its own clock.

The processor 30 of wireless terminal 20, and particularly the synchronization controller 32, comprises synchronization reliability factor sensor 34. The synchronization reliability factor sensor 34 is configured to obtain a synchronization reliability factor for use by the wireless terminal. The term "sensor" does not require that the synchronization reliability factor sensor 34 actually make a measurement per se, although in some example embodiments it may do so. Rather, "sensor" encompasses any and all techniques for receiving, ascertaining, and/or deducing the synchronization reliability factor.

Figure 4B:
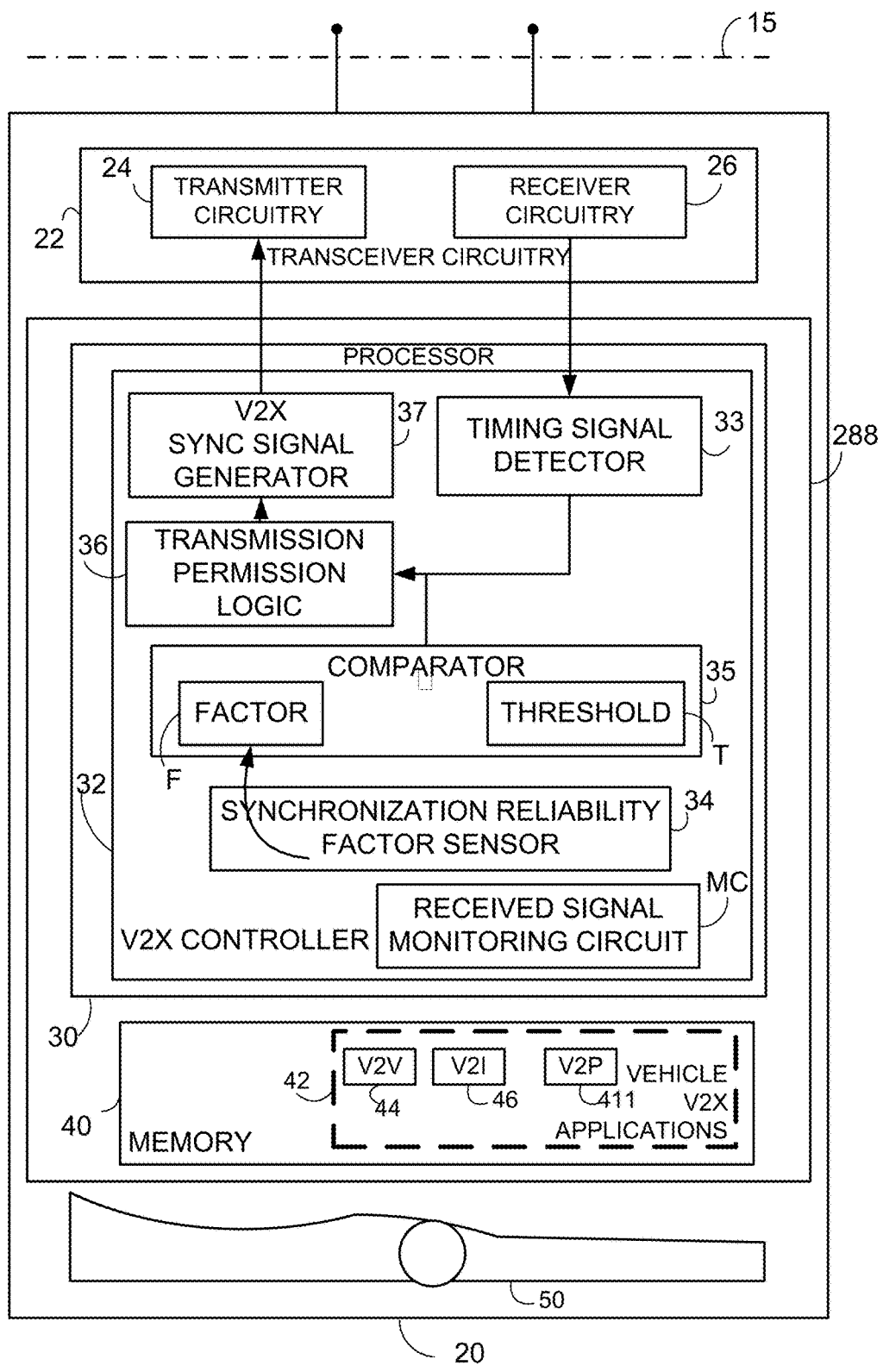
FIG. 4B is a schematic view of an example embodiment of a wireless terminal suitable configured to check wireless terminal battery power as a synchronization reliability factor before acting as a synchronization source for vehicle (V2X) communications.

As shown in FIG. 3B and FIG. 4B, for example, the synchronization reliability factor sensor 34 may obtain a strength measurement of a receiving timing signal or synchronization signal from received signal monitoring circuitry MC.

Figure 4C:
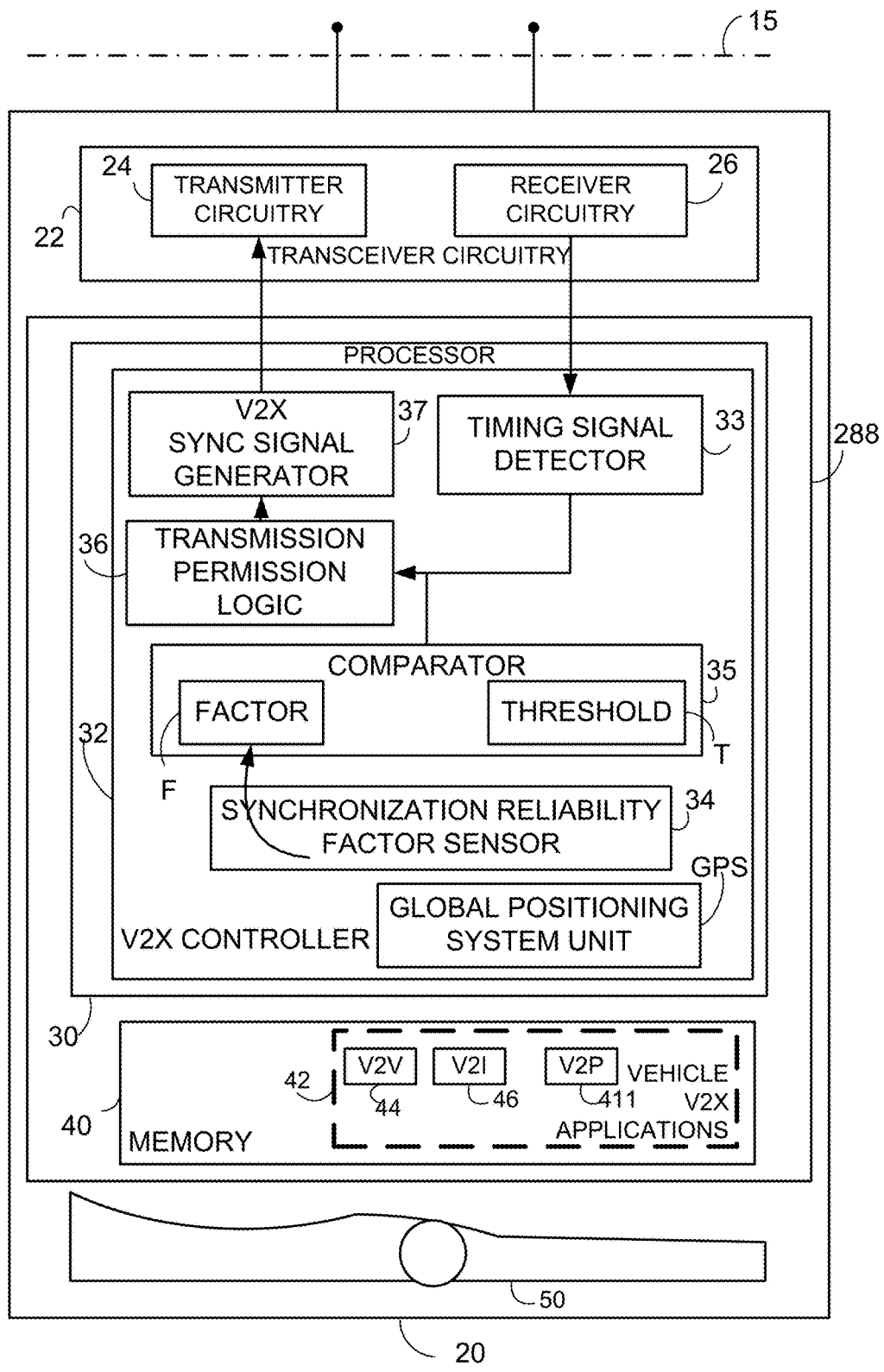
FIG. 4C is a schematic view of an example embodiment of a wireless terminal suitable configured to check wireless terminal velocity as a synchronization reliability factor before acting as a synchronization source for vehicle (V2X) communications.

Referring to FIG. 3C, in the example embodiment of FIG. 4C the synchronization reliability factor sensor 34 may obtain information for determining velocity of a device (e.g., wireless terminal $WT_M$) from which it obtains a timing signal or synchronization signal. Such velocity-indicative information may be obtained from the synchronization sequences themselves (e.g., as disclosed in U.S. provisional patent application: 62/313,600, filed Mar. 25, 2016, entitled "SYNCHRONIZATION METHOD AND APPARATUS FOR V2X COMMUNICATIONS", which is incorporated herein by reference in its entirety), or the corresponding synchronization signal associated broadcast information, or from messages of other wireless terminals, or from higher layers. As used herein, "velocity" may comprise the SyncRef UE absolute velocity, the SyncRef UE absolute velocity and its motion direction, or the relative velocity between SyncRef UE and the reception UE".

The processor 30 of wireless terminal 20 also comprises comparator 35. The comparator 35 is configured to make a comparison of the synchronization reliability factor ("F") with a threshold value ("T"). In an example embodiment and mode, the threshold value T may be configured (e.g., pre-configured, or at some point in time inputted into memory 40). In other example embodiments and modes the threshold value T may be received by the wireless terminal from a cellular radio access network. For example, in an example embodiment and mode the threshold value T may be received by the wireless terminal 20 in a system information block (SIB) broadcast by the cellular radio access network. The value of the threshold value T depends, of course, on the nature of the synchronization reliability factor. In some example embodiments and modes the threshold value T may simply be a flag or indication that a certain feature of the wireless terminal is ON or OFF. In other example embodiments and modes the threshold value may be a non-binary number, such as (for the example embodiment and mode of FIG. 3C and FIG. 4C) a velocity threshold value above which the wireless terminal cannot effectively operate as a synchronization source. For example, in the FIG. 3C/FIG. 4C example embodiment and mode the velocity threshold value may be set in dependence upon Doppler shift affecting accuracy of timing of the synchronization signal.

The processor 30 further comprises transmission permission logic 36 which is configured to use a result of the comparison (performed by comparator 35) to make a determination whether to permit transmission of a synchronization signal based on the received timing signal. In some example embodiments and modes the transmission permission logic 36 may, knowing the nature of the synchronization reliability factor, essentially check the value of a flag or binary value to determine whether a particular feature is ON or OFF, for example. In other example embodiments and modes the comparison performed by transmission permission logic 36 may be an actually mathematical comparison of two values, e.g., of an actual vehicle speed of the source of the received synchronization signal or timing signal, to a velocity threshold value (as obtained from the network or even configured at the wireless terminal 20).

In addition, processor 30 comprises V2X synchronization signal generator 37 which, when permitted by transmission permission logic 36, generates the synchronization signal, e.g., generates a synchronization sequence for the vehicle (V2X) communication. When permitted in accordance with the determination of transmission permission logic 36, the transmitter circuitry 24 transmits the synchronization signal over a frequency used for vehicle (V2X) communications.

Figure 5A:
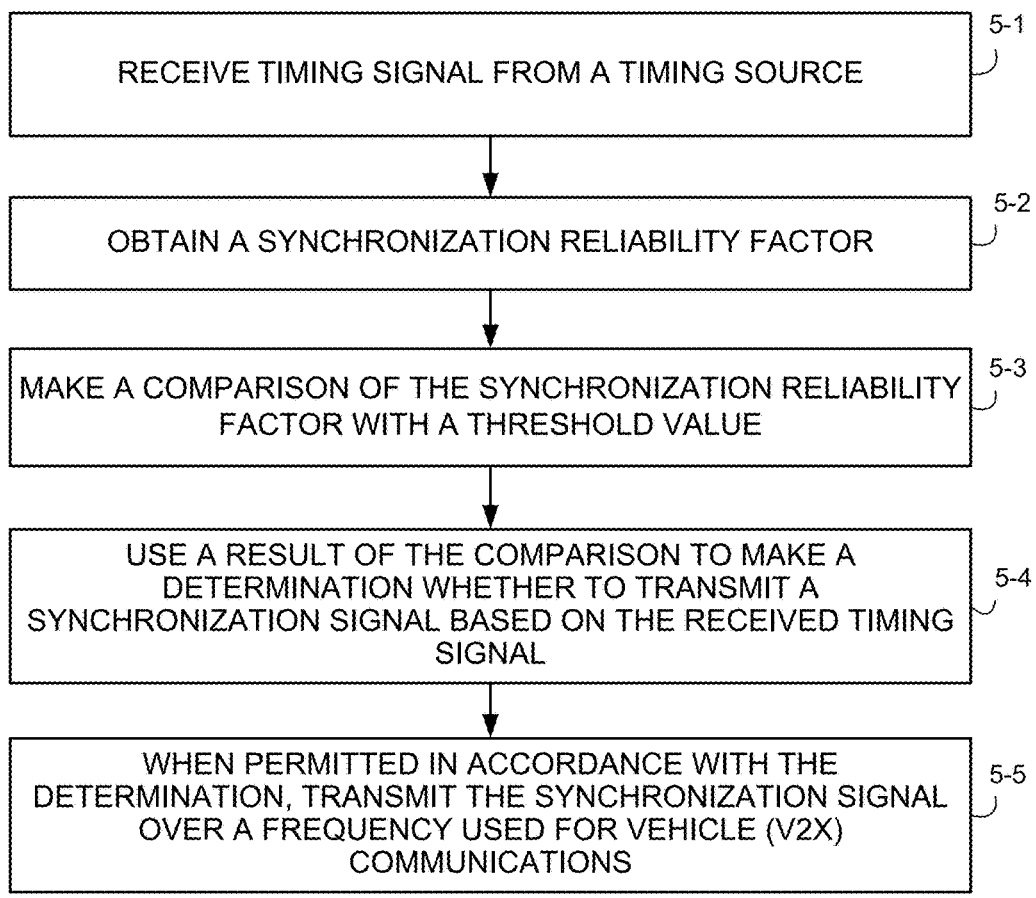
FIG. 5A is a flowchart depicting basic, example acts or steps involved in generic method of operating a wireless terminal configured to check a synchronization reliability factor before acting as a synchronization source for vehicle (V2X) communications.

FIG. 5A is a flowchart depicting basic, example acts or steps involved in generic method of operating the generic wireless terminal 20 of FIG. 4A. Act 5-1 comprises receiving (e.g., by receiver circuitry 26) a timing signal from a timing source. Act 5-2 comprises obtaining a synchronization reliability factor. In an example embodiment and mode act 5-2 may be performed by synchronization reliability factor sensor 34. Act 5-3 comprises making a comparison of the synchronization reliability factor F with the threshold value T. In an example embodiment and mode act 5-3 may be performed by comparator 35. Act 5-4 comprises using a result of the comparison (of act 5-3) to make a determination whether to permit transmission of a synchronization signal based on the received timing signal. In an example embodiment and mode act 5-4 may be performed by transmission permission logic 36. When permitted in accordance with the determination of act 5-4, act 5-5 comprises transmitting the synchronization signal over a frequency used for vehicle (V2X) communications. The synchronization signal is generated by V2X synchronization signal generator 37, and transmitted over vehicle (V2X) communication radio interface 15 by transmitter circuitry 24.

Figure 5B:
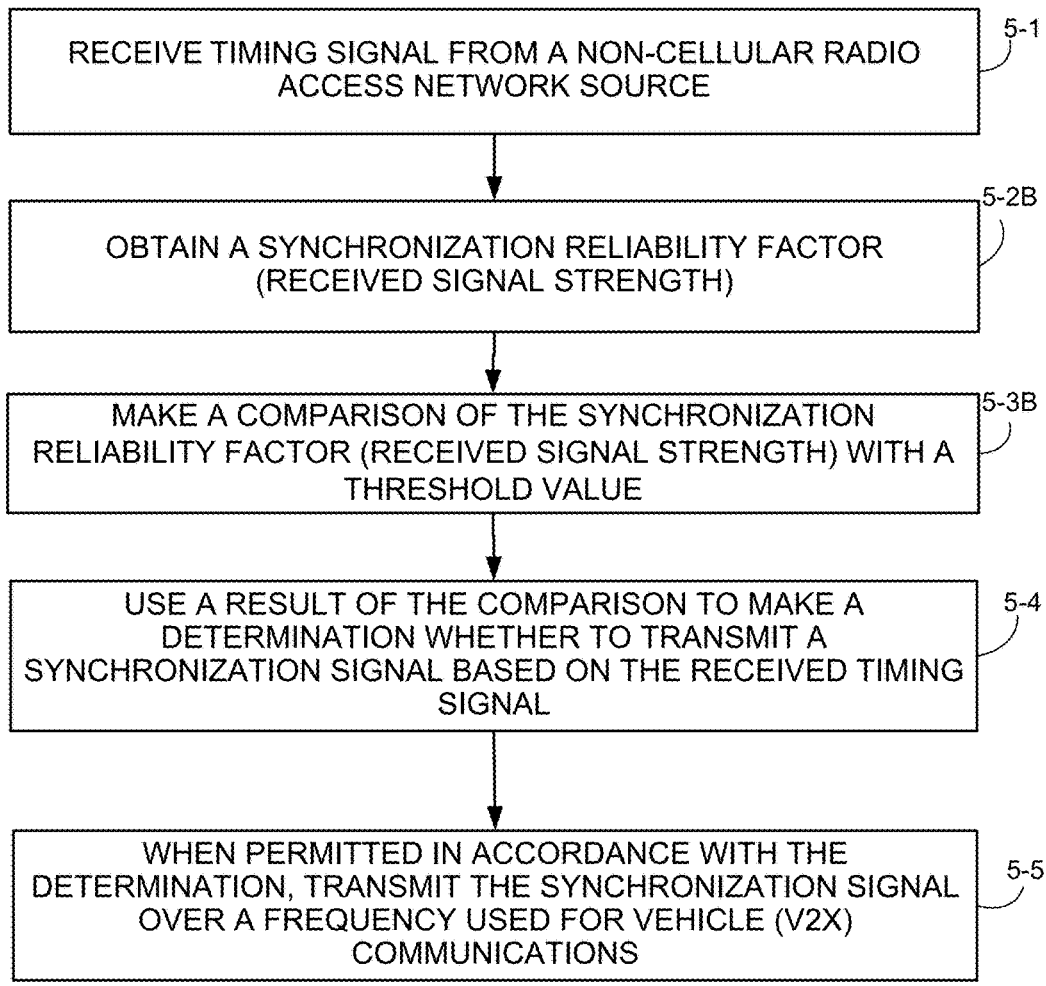
FIG. 5B is a flowchart depicting basic, example acts or steps involved in generic method of operating a wireless terminal configured to check measurement strength of a timing signal before acting as a synchronization source for vehicle (V2X) communications.

FIG. 5B shows an implementation of the basic method of FIG. 5A in which the synchronization reliability factor is the strength of the received timing signal or synchronization signal. FIG. 5B particularly shows that act 5-2B as comprising obtaining received signal strength as the synchronization reliability factor, and act 5-3B comprises making a comparison of the synchronization reliability factor (received signal strength) with the threshold value. It will be appreciated that the embodiment of FIG. 3B, FIG. 4B, and FIG. 5B involving use of received signal strength as the synchronization reliability factor applies regardless of the nature of the entity from which the received signal is transmitted. For example, the received signal for the FIG. 3B, FIG. 4B, and FIG. 5B embodiment may be from a non-cellular radio access network timing source, or from a device of a cellular radio access network (whether such devices is using network timing or its own timing or timing derived from a non-cellular radio access network timing source), or from a non-cellular radio access network timing source. Act 5-3B may be performed by transmission permission logic 36. For example, the transmission permission logic 36 may make the determination to transmit the synchronization signal in dependence on the strength measurement of the timing signal exceeding a strength minimum threshold value by a hysteresis value.

Figure 5C:
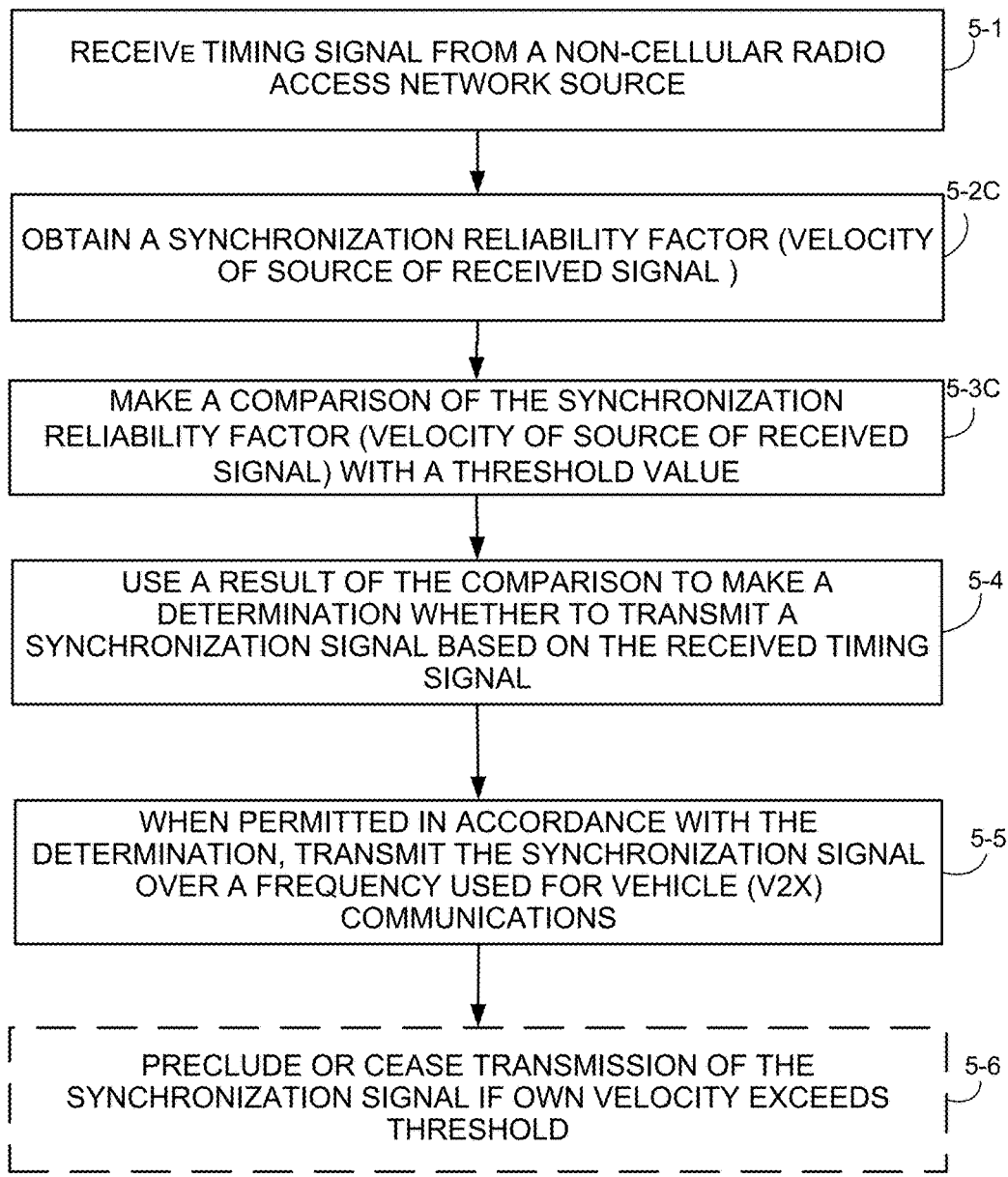
FIG. 5C is a flowchart depicting basic, example acts or steps involved in generic method of operating a wireless terminal configured to further check velocity of a source of a received timing signal or synchronization signal before acting as a synchronization source for vehicle (V2X) communications.

FIG. 5C shows an implementation of the basic method of FIG. 5A in which the synchronization reliability factor is velocity of the source of the received timing signal or synchronization signal. FIG. 5C particularly shows act 5-2C as comprising obtaining velocity of the source of the received signal as the synchronization reliability factor, and act 5-3C comprises making a comparison of the velocity with the threshold value. It will be appreciated that the embodiment of FIG. 3C, FIG. 4C, and FIG. 5C involving use of velocity of the source of the received signal need not apply when the received signal is directly received from a signal source which is essentially static relative to the earth and thus to the receiver.

In an example variation, the method of FIG. 5C further include act 5-6. Act 5-6 comprises precluding or ceasing transmission by wireless terminal 20 of the synchronization signal generated by wireless terminal 20 if the velocity of wireless terminal 20 exceeds a specified threshold. For example, if the synchronization source (in this case wireless terminal 20) increases its speed to be higher than the velocity threshold to certain level, wireless terminal 20 should stop synchronization signal transmission". If a downstream wireless terminal realized that wireless terminal 20 were configured to perform act 5-6, checking downstream for the possibility of unreliable synchronization signal due to velocity may no longer be necessary at the terminal reception side.

It should be understood that processor 30, in enabling the wireless terminal 20 to check for synchronization reliability before acting as a synchronization source for vehicle (V2X) communications, may execute a computer program or computer program product comprising coded instructions stored in non-transient memory, e.g., in memory 40. Table 1 below describes, e.g., an algorithm that may be comprise a particular implementation of the computer program, and moreover uses some V2X terminology. In Table 1, "SLSS" refers to a timing signal or synchronization signal which is not directly obtained from a non-cellular radio access network, e.g., not directly from GNSS, and thus may include a timing signal or synchronization signal which, although ultimately obtained from GNSS, is received via a network device such as another wireless terminal.

TABLE 1

In selection and reselection of synchronization reference UE,
if the GNSS signal is selected as synchronization reference, the following conditions have to
be met: when evaluating the detected GNSS signals, apply layer 3 filtering as specified in
5.5.3.2 of TS 36.331 using the preconfigured filterCoefficient as defined in 9.3 of TS 36.331,
before using the GNSS signal measurement results. Then the measured GNSS signal
measurement have to exceeds the minimum requirement TS 36.133 [16] by syncRefMinHyst.
[use the language in issue (1) description to further modify].
if the SLSS is selected as synchronization reference, when evaluating the detected SLSSID,
apply layer 3 filtering as specified in 5.5.3.2 using the preconfigured filterCoefficient as
defined in 9.3, before using the S-RSRP measurement results; Then:
Alt A> the measured S-RSRP measurement have to exceeds the minimum requirement TS
36.133 [16] by syncRefMinHyst
Alt B>
"The velocity of the UE transmitting measured SLSS is lower than some threshold certain
amount, e.g., the threshold could be syncRefMaxVelocity; and the "certain amount" may be
syncRefVelocityMinHyst". Then we have to explain as this certain amount (e.g.,
"syncRefVelocityMinHyst") may be 0, which means if it is just lower than some threshold,
wireless terminal B can regard wireless terminal A's SLSS as reliable signal. Otherwise
wireless terminal B can just ignore wireless terminal A's SLSS when wireless terminal B is
picking synchronization signal (GNSS synchronization signal or SLSS) for its timing.
Either Alt A> only, or both of Alt A> and Alt B>, should be met"
"SyncRefMaxVelocity" indicates the highest speed the UE can have when the UE's
transmitted SLSS is regarded as reliable signal. Once the UE's speed is higher than this
threshold, severe Dopper shift occurs which affects the accuracy of timing transmitted by the
UE a lot;
"SyncRejMaxVelocity" information element can be preconfigured information in UE, just like
syncRefMinHyst; or can also be broadcasted to UE in SystemInformationBlockType18 with
modification for new 3GPP release applicable for V2X, or new defined SIB dedicated for
V2X, or signaled to particular UE through RRC connect and RRC reconfiguration signallings.
If the velocity of the SyncRef UE which transmitting synchronization signal increases the
speed to higher than SyncRefMaxVelocity to certain amount. It will trigger the UE to stop
synchronization signal transmission.

TABLE 1-continued

The detected GNSS SLSSIDs" means they are SLSS, sidelink synchronization sequences can only be transmitted from SyncRef UEs; and their corresponding signal quality/strength measurement is S-RSRP. "GNSS signal measurement results" means they are GNSS signals from non-network devices directly, such as satellite. Therefore, the UE may face two incoming signals, one is GNSS signal directly, the other is synchronization signal from some SyncRef UE whose sequence ID indicates the timing of this synchronization signal (SLSS) is originally from GNSS.

Figure 6A:
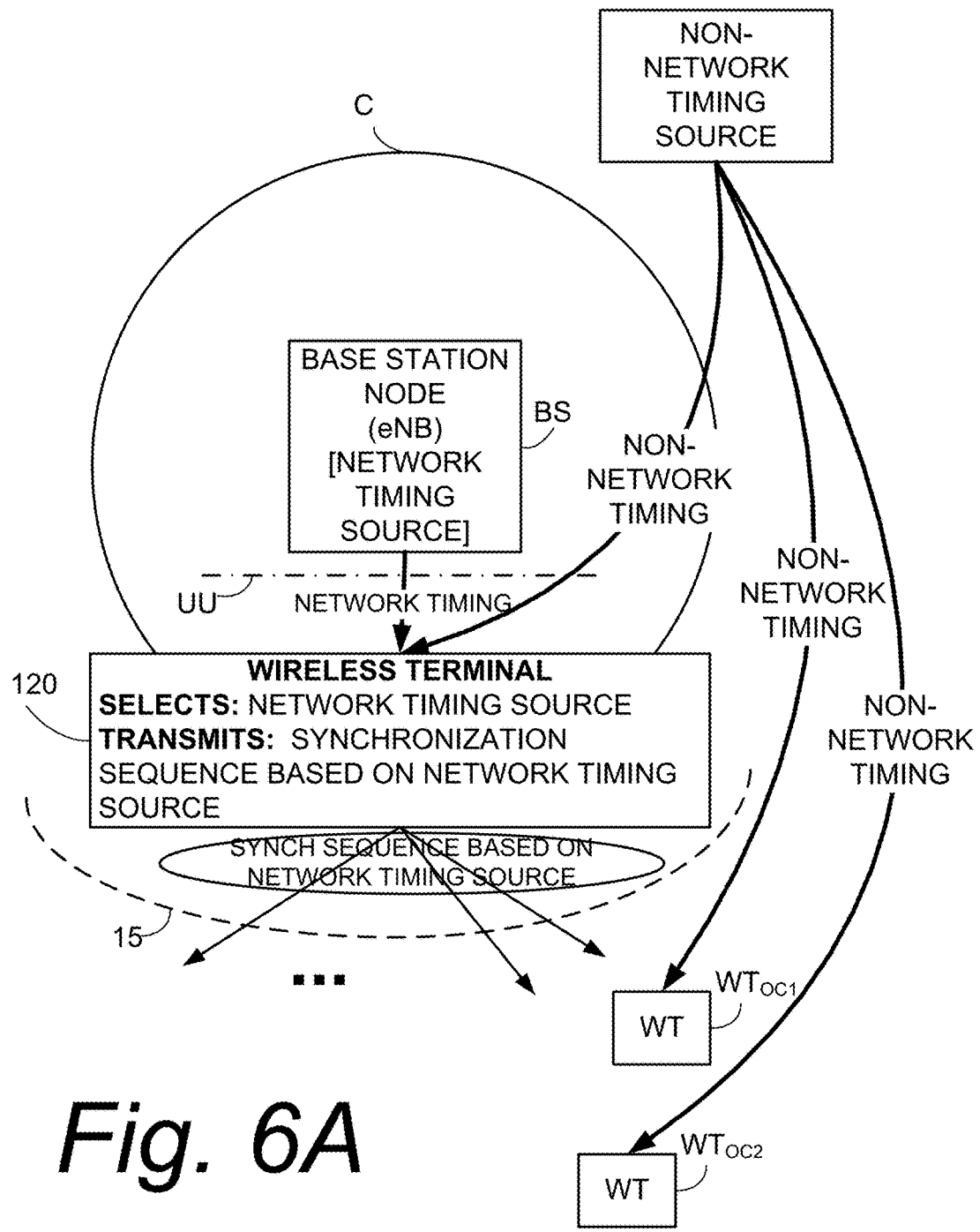
FIG. 6A is a diagrammatic view of a wireless terminal configured to make a choice of timing source and determines in accordance with the choice whether the wireless terminal should act as a (V2X) synchronization source, FIG. 6A particularly showing the wireless terminal choosing a network timing source and acting as a synchronization source for a vehicle (V2X) communication by transmitting a synchronization sequence based on the network timing source.

Another aspect of the technology disclosed herein concerns apparatus, method, and technique for judiciously curtailing synchronization information transmitted for vehicle (V2X) communications. In this regard, FIG. 6A is a diagrammatic view of a wireless terminal 120, which is in network coverage (e.g., within coverage of the radio access network), and which is configured to make a choice of timing source and to determine in accordance with the choice whether the wireless terminal can act as a (V2X) synchronization source. The choice of timing source for the in-coverage wireless terminal 120 of FIG. 6A is either the network timing source (obtained from the illustrated base station node eNB across the Uu interface) or the non-cellular radio access network timing source, e.g., the non-network timing sources. As mentioned before, the "non-cellular radio access network source" is a timing source which is available throughout a cellular radio access network but maintained external to the cellular radio access network (in contrast to a timing source that is maintained by the cellular radio access network).

FIG. 6A particularly shows the in-coverage wireless terminal 120 choosing a network timing source and acting as a synchronization source for a vehicle (V2X) communication by transmitting a synchronization sequence based on the network timing source. It may be, for example, that other wireless terminals WT which are out of network coverage would not have access to the network timing source, or that synchronization information based on the network timing source is not as readily available for wireless terminals outside of the network (in comparison to the non-cellular radio access network timing source, such as GNSS, which may be widely available as shown in FIG. 6A).

Figure 6B:
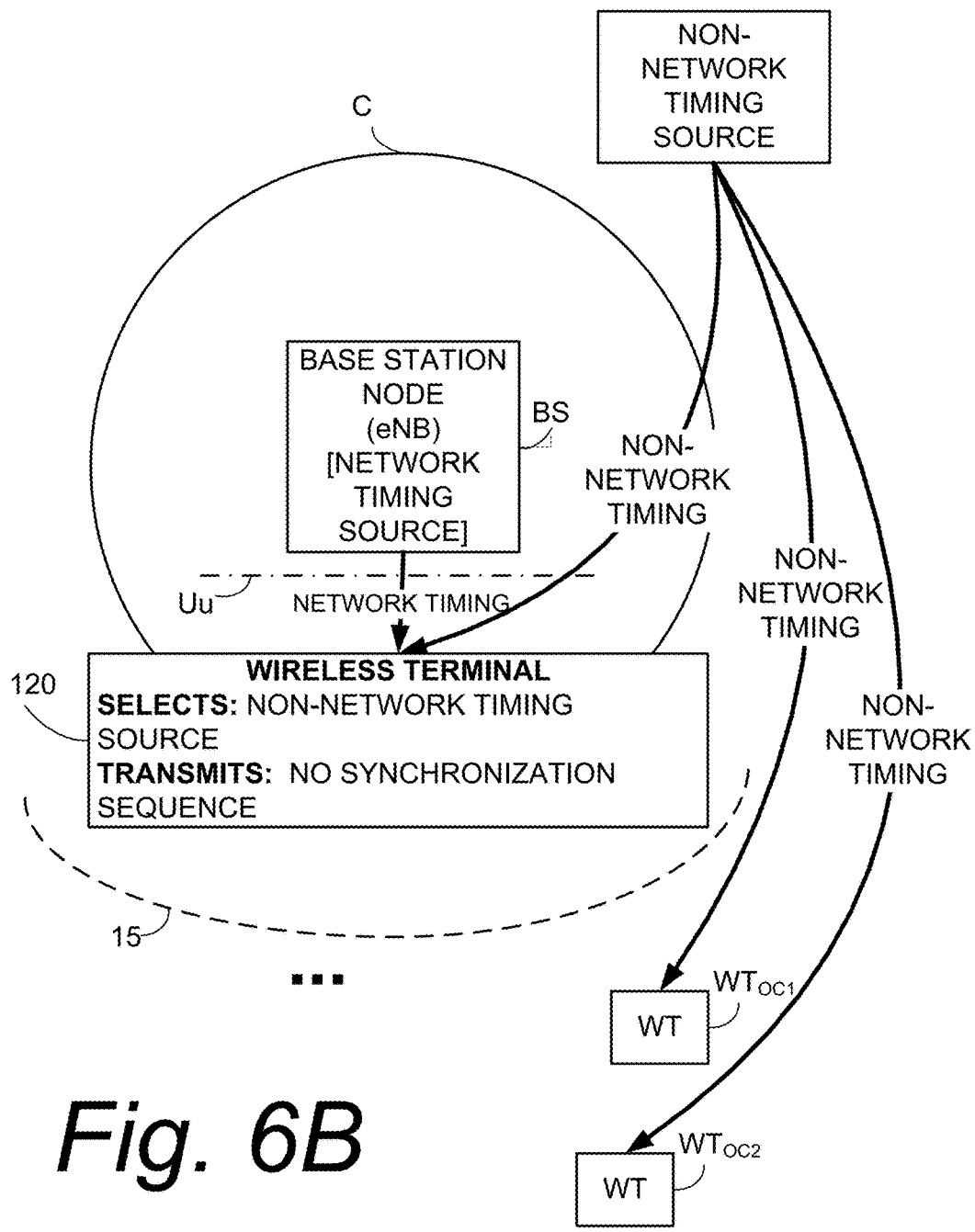
FIG. 6B is a diagrammatic view of the wireless terminal of FIG. 6A, particularly showing the wireless terminal choosing a non-network timing source and thereafter not acting as a synchronization source for a vehicle (V2X) communication.

On the other hand, FIG. 6B shows a situation in which the in-coverage wireless terminal 120 chooses a non-network timing source and thereafter, in accordance with this aspect of the technology disclosed herein, does not act as a synchronization source for a vehicle (V2X) communication. It can be appreciated from FIG. 6B that if the wireless terminal 120 were to transmit a synchronization sequence based on the non-cellular radio access network timing source, the transmission of the synchronization sequence based on the non-cellular radio access network timing source would be wasteful if not superfluous in view of the fact that other wireless terminals WT outside of the radio access network already have abundant access to synchronization information from the non-cellular radio access network timing source, as would be the case for a GNSS timing source, for example. Therefore, in the FIG. 6B scenario the in-coverage wireless terminal 120 curtails transmission of synchronization information for vehicle (V2X) communications, so that, e.g., a GNSS-based synchronization sequence is not transmitted over vehicle (V2X) communication radio interface 15.

Figure 7A:
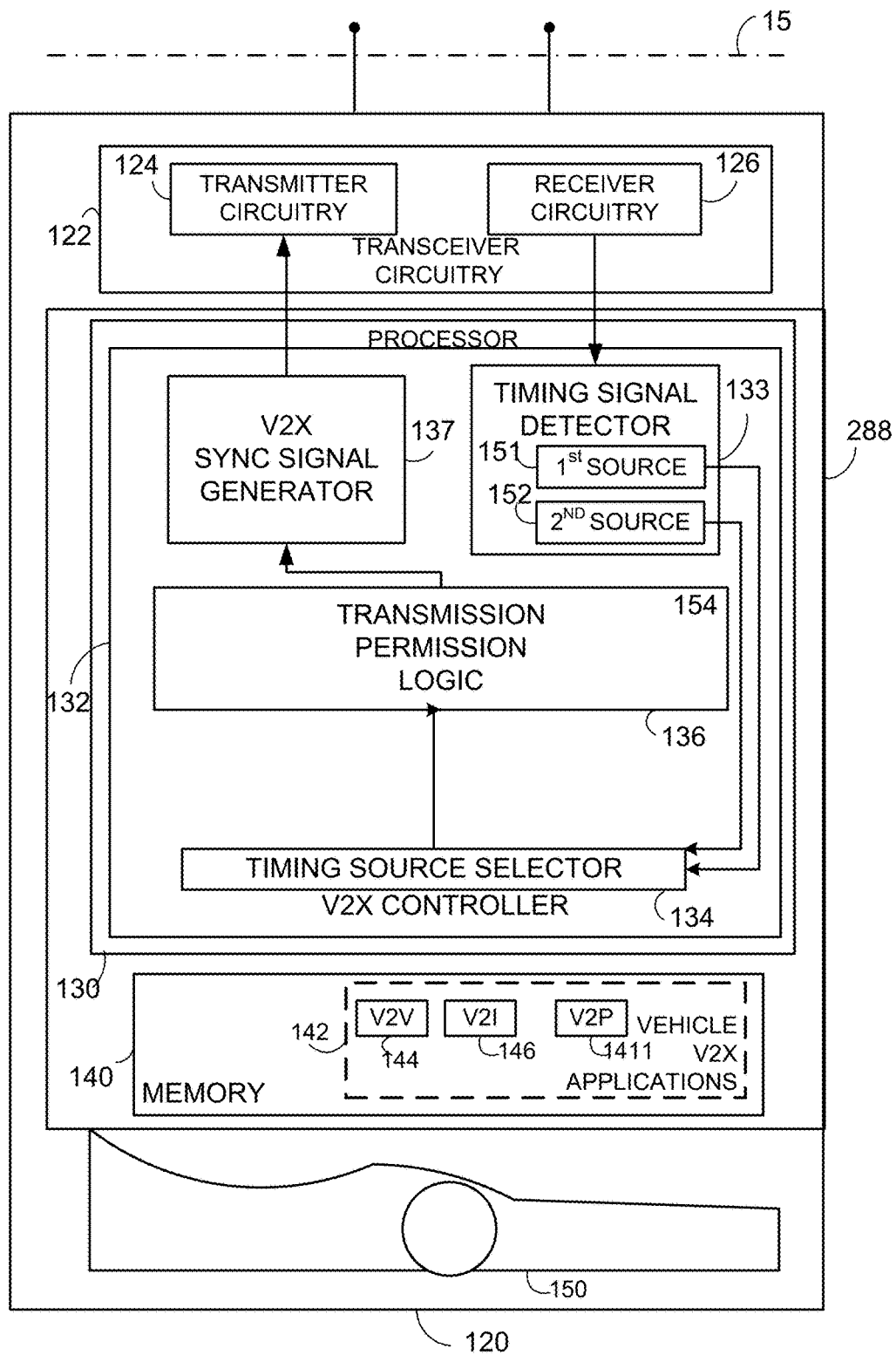
FIG. 7A is a schematic view of a generic wireless terminal configured to choose a timing source and to determine in accordance with the choice whether the wireless terminal should act as a (V2X) synchronization source.

FIG. 7A shows various example, representative, non-limiting components and functionalities herein pertinent of a generic in-coverage wireless terminal 120 which is configured to choose a timing source and to determine in accordance with the choice whether the wireless terminal should act as a (V2X) synchronization source. The wireless terminal 20 comprises transceiver circuitry 122, which in turn comprises transmitter circuitry 124 and receiver circuitry 126. The transceiver circuitry 122 includes antenna(e) for the wireless terminal 120. Transmitter circuitry 124 includes, e.g., a frame generator, amplifier(s), modulation circuitry and other conventional transmission equipment. Receiver circuitry 126 comprises, e.g., demodulation circuitry, a frame deformatter, and other conventional receiver equipment. The transceiver circuitry 122 is configured to use resources allocated for V2X communication, whether those resources be shared with sidelink direct (SLD) communications or separate and distinct for V2X communication as previously described.

The in-coverage wireless terminal 120 further comprises processor circuitry, also herein known more simply as processor 130. While processor 130 may have responsibility for operation of many aspects of wireless terminal 120 not specifically described herein, in one of its aspects processor 130 serves as a VCX controller 132 for controlling aspects of vehicle (V2X) communication. As further illustrated in FIG. 7A, the synchronization controller 132 in turn comprises timing signal detector 133; timing source selector 134; transmission permission logic 136; and V2X synchronization signal generator 137.

In addition to the processor circuitry 130, wireless terminal 120 also comprises memory 140 (e.g., memory circuitry) which may store an operating system and various application programs, such as vehicle (V2X) communication applications 144 (including V2I application 146, V2V (vehicle-to-vehicle) application 147 and V2P (vehicle-to-pedestrian) application 148, discussed above. The memory 140 may be any suitable type of memory, e.g., random access memory (RAM), read only memory (ROM), cache memory, processor register memory, or any combination of one or more memory types. The applications such as V2X applications 144 comprise instructions executable by processor circuitry 130 and are stored in non-transient portions of memory 140.

The in-coverage wireless terminal 120 further comprises user interface(s) 150. The user interfaces 150 may comprise one or more suitable input/output devices which are operable by a user. Some of all of the user interfaces 150 may be realized by a touch sensitive screen. The user interface(s) 150 may also comprise a keyboard, audio input and output, and other user I/O devices. Only a portion of the user interfaces 150 is depicted in FIG. 7A, it being understood that the user interfaces 150 may be provided on a cover or case of wireless terminal 150 and thus may visibly obscure the underlying other components shown in FIG. 7A.

As shown in FIG. 7A, the receiver circuitry 126 of in-coverage wireless terminal 120 is configured to receive a first synchronization signal based on a first timing source which is available throughout a cellular radio access network but maintained external to the cellular radio access network. FIG. 7A shows timing signal detector 133 detecting the first synchronization signal based on a first timing source, which first synchronization signal is identified as $1^{st}$ source 151 in FIG. 7A. The receiver circuitry 126 is also configured to a second synchronization signal based on a second timing source maintained by the cellular radio access network, which is second synchronization signal is identified as $2^{nd}$ source 152 in FIG. 7A. Information concerning the first timing source and the second timing source are sent to timing source selector 134.

The timing source selector 134, which comprises VCX controller 132, makes a selection between the first timing source and the second timing source. The selection of one of the first timing source and the second timing source is a selection of the timing source to be used by in-coverage wireless terminal 120.

The transmission permission logic 136 is configured either to permit or not permit transmission of a synchronization sequence depending on the selection made by timing source selector 134. If the selection by timing source selector 134 is the second timing source, the transmission permission logic 136 permits transmission from the wireless terminal of a synchronization sequence based on the second timing source (e.g., the network timing source). On the other hand, if the selection by timing source selector 134 is the first timing source, the transmission permission logic 136 does not permit transmission of a synchronization sequence.

The transmitter 124 of in-coverage wireless terminal 120 is configured, when so permitted by transmission permission logic 136, to transmit over vehicle (V2X) communication radio interface 15 the synchronization sequence based on the second timing source for use in vehicle (V2X) communications.

Figure 8A:
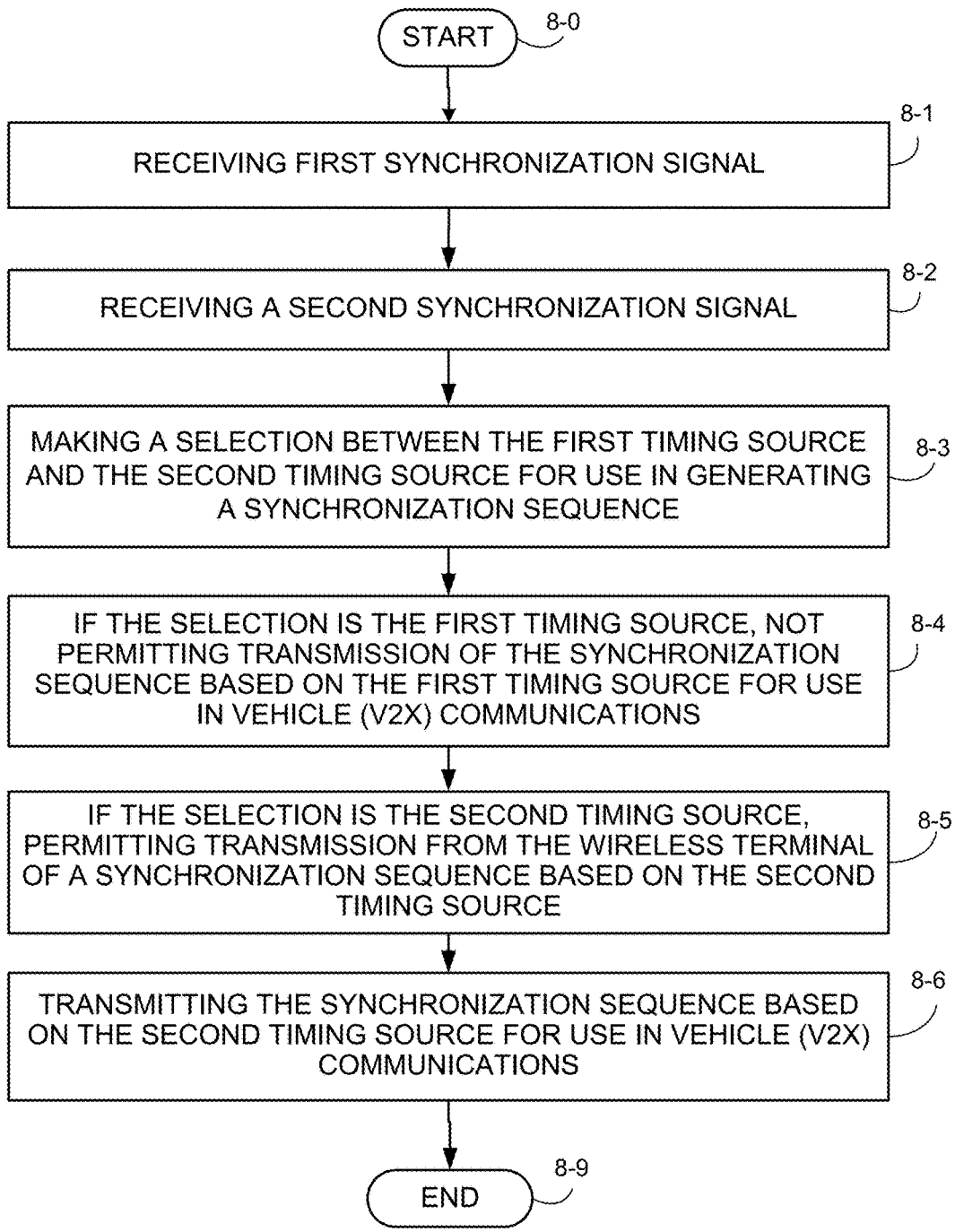
FIG. 8A is a flowchart depicting basic, example acts or steps involved in generic method of operating a wireless terminal configured to choose a timing source and to determine in accordance with the choice whether the wireless terminal should act as a (V2X) synchronization source.

FIG. 8A is a flowchart depicting basic, example acts or steps involved in generic method of operating the in-coverage wireless terminal 120 of FIG. 7A in choosing a timing source and determining in accordance with the choice whether the wireless terminal can act as a (V2X) synchronization source. The routine of FIG. 8A starts with act 8-0. Act 8-1 comprises the receiver circuitry 126 receiving the first synchronization signal (e.g., the synchronization signal based on the first timing source which is available throughout a cellular radio access network but maintained external to the cellular radio access network). Act 8-2 comprises the receiver circuitry 126 receiving the second synchronization signal (which is based on a second timing source maintained by the cellular radio access network). Act 8-3 comprises timing source selector 134 of processor 130 making a selection between the first timing source and the second timing source. If the selection of act 8-3 is the first timing source, act 8-4 comprises the transmission permission logic 136 not permitting transmission of the synchronization sequence based on the first timing source for use in vehicle (V2X) communications. On the other hand, if the selection of act 8-3 is the second timing source, act 8-5 comprises the transmission permission logic 136 permitting transmission from the wireless terminal of a synchronization sequence based on the second timing source. Act 8-7 shows the transmitter circuitry 24 transmitting the synchronization sequence based on the second timing source for use in vehicle (V2X) communications. Thereafter at act 8-9 processing of the routine of FIG. 8A concludes.

Figure 7B:
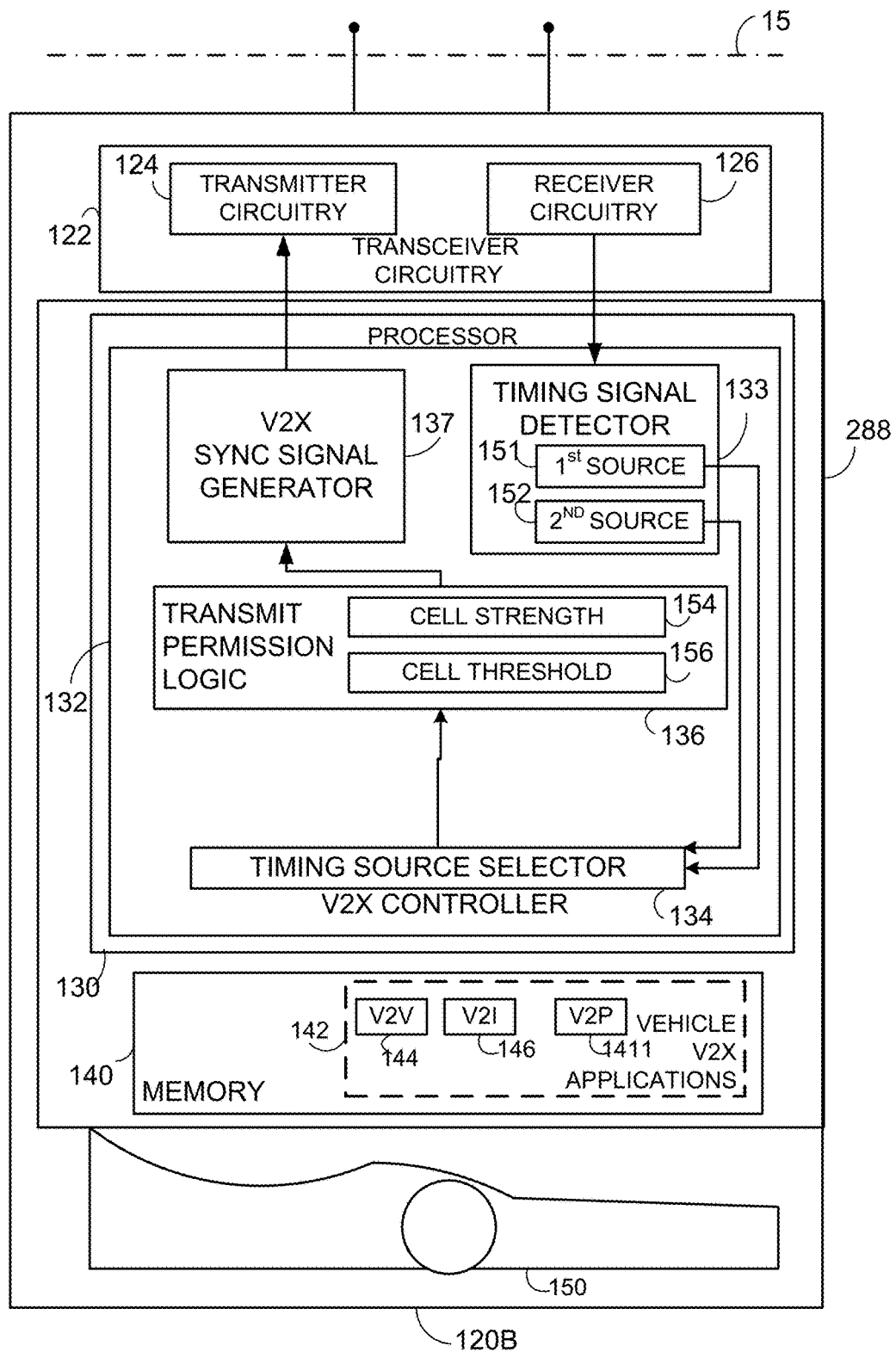
FIG. 7B is a schematic view of another example embodiment of a wireless terminal configured to choose a timing source and to determine in accordance with the choice whether the wireless terminal should act as a (V2X) synchronization source, and configured to determine whether the wireless terminal should act as a (V2X) synchronization source based on the choice of timing source and a strength measurement of a cell of the cellular radio access network chosen for transmission of the synchronization sequence is below a predetermined threshold.

FIG. 7B shows various example, representative, non-limiting components and functionalities herein pertinent of another embodiment of an in-coverage wireless terminal 120B which is configured to choose a timing source, and configured to determine whether the wireless terminal should act as a (V2X) synchronization source based on the choice of timing source and a strength measurement of a cell of the cellular radio access network chosen for transmission of the synchronization sequence is below a predetermined threshold. The components and functionalities of the in-coverage wireless terminal 120B of FIG. 7B which are essentially the same as FIG. 7A bear same reference numerals. The in-coverage wireless terminal 120B of FIG. 7B differs from FIG. 7A in showing transmission permission logic 136 as being further configured, as a precondition to permit the transmission of the synchronization sequence, to determine that a strength measurement of a cell of the cellular radio access network chosen for transmission of the synchronization sequence is below a predetermined threshold. In this regard, the transmission permission logic 136 of FIG. 7B shows the transmission permission logic 136 as comparing or evaluating a cell strength measurement 154 with a predetermined cell strength threshold 156 (e.g., cell threshold"). The transmission permission logic 136 may obtain the predetermined cell strength threshold 156 from a system information block broadcasted from the cellular radio access network. In an example, non-limiting implementation, the predetermined threshold may be an information element syncTxThreshIC.

Figure 8B:
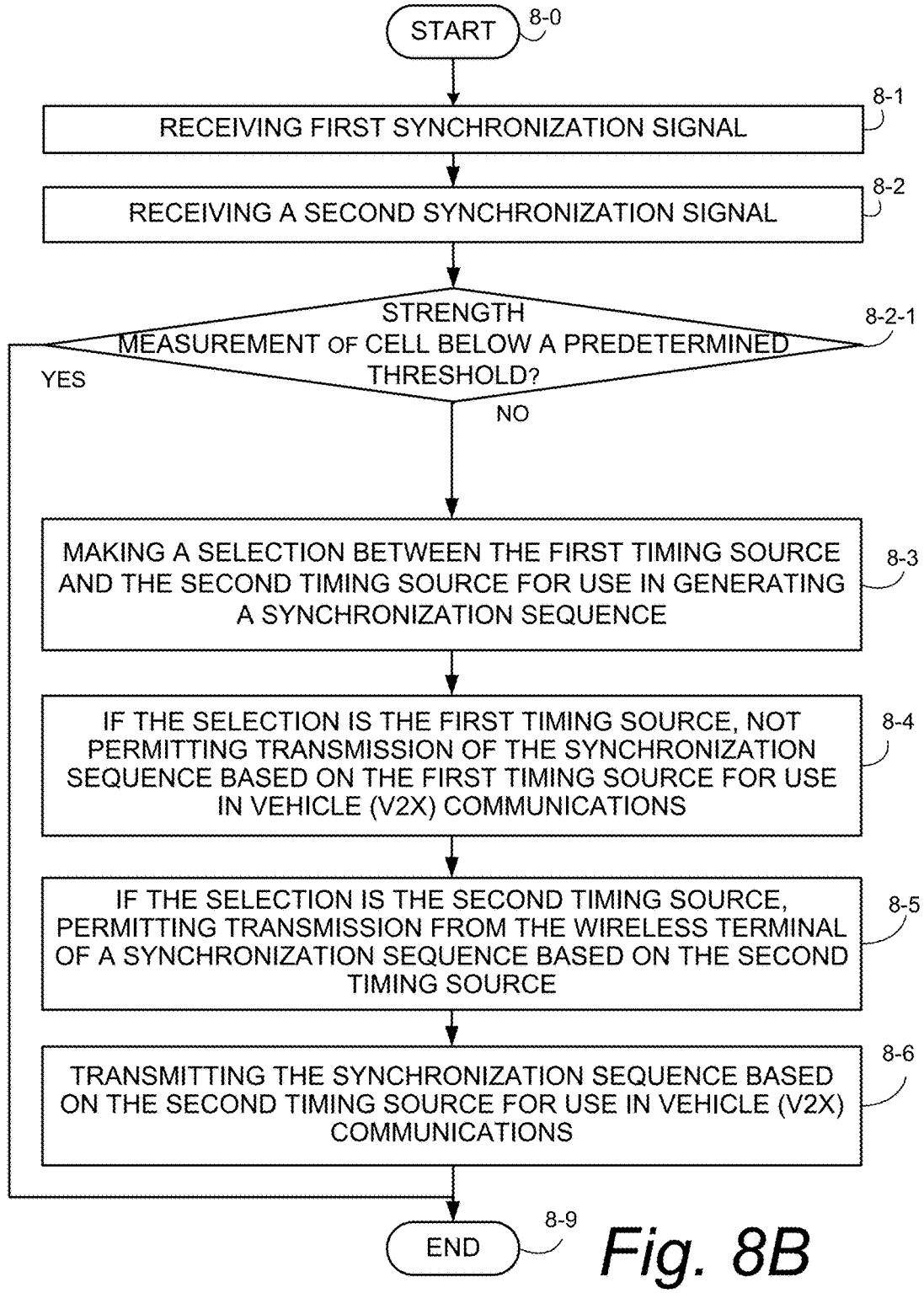
FIG. 8B is a flowchart depicting basic, example acts or steps involved in variation of the method of FIG. 8A for the example embodiment of wireless terminal shown in FIG. 7B.

FIG. 8B is a flowchart depicting basic, example acts or steps involved in variation of the method of FIG. 8A, as implemented by the in-coverage wireless terminal 120B of FIG. 7B. The acts or steps of FIG. 8B which are essentially identical to those of FIG. 8A are similarly numbered. FIG. 8B primarily differs from FIG. 8A by including act 8-2-1. Act 8-2-1 comprises checking whether the strength measurement of a cell of the cellular radio access network chosen for transmission of the synchronization sequence is below a predetermined threshold, e.g., below the predetermined cell strength threshold 156. If the check of act 8-2-1 shows that the strength measurement of a cell of the cellular radio access network chosen for transmission of the synchronization sequence is below the predetermined threshold, execution terminates as reflected by act 8-9. Otherwise processing continues with act 8-3.

Figure 7C:
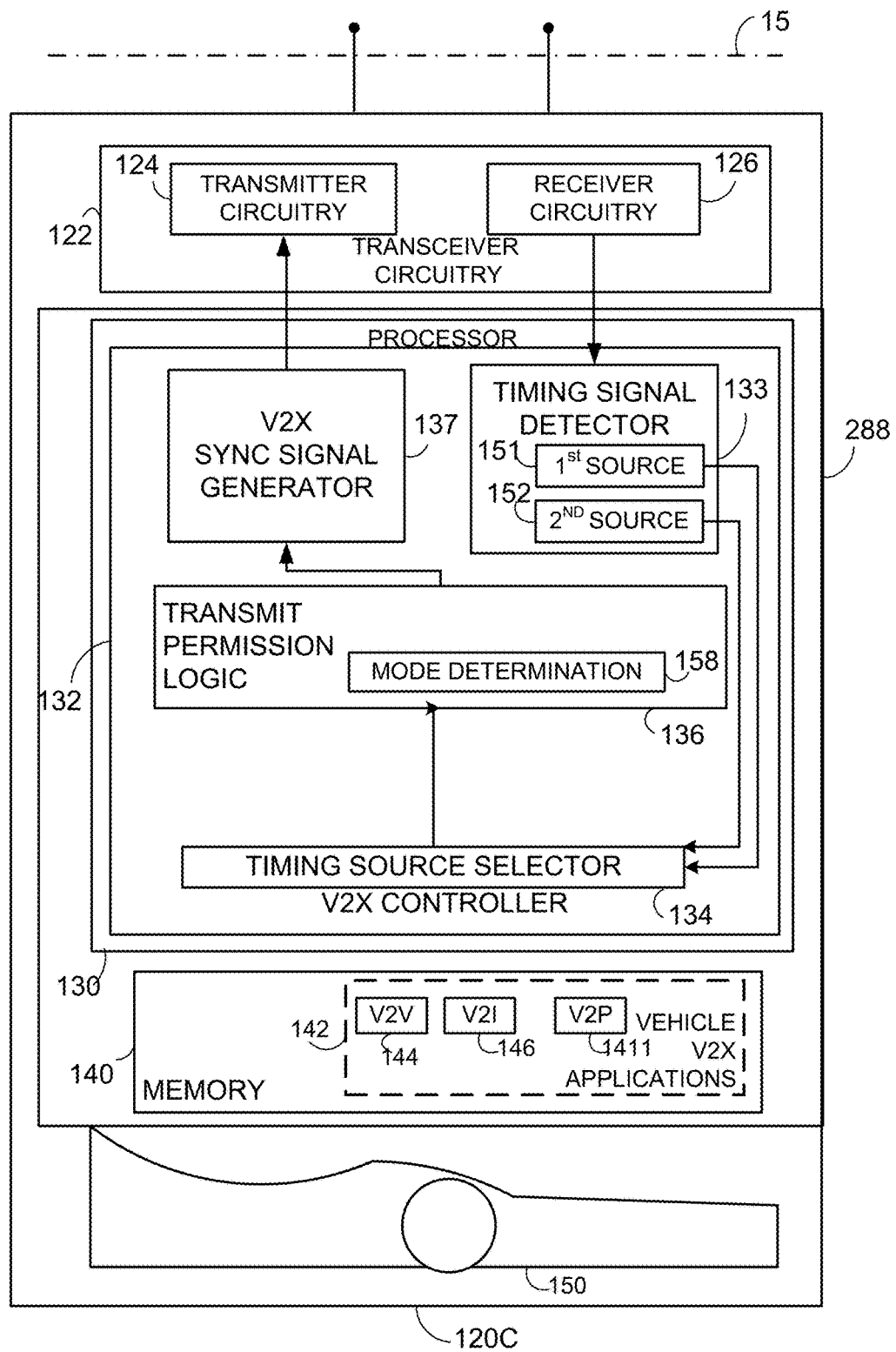
FIG. 7C is a schematic view of another example embodiment of a wireless terminal configured to choose a timing source and to determine in accordance with the choice whether the wireless terminal should act as a (V2X) synchronization source, and configured to determine whether the wireless terminal should act as a (V2X) synchronization source based on RRC mode in which the in-coverage wireless terminal is operating.

FIG. 7C shows various example, representative, non-limiting components and functionalities herein pertinent of another embodiment of an in-coverage wireless terminal 120C which is configured to choose a timing source, and configured to determine whether the wireless terminal should act as a (V2X) synchronization source based on RRC mode in which the in-coverage wireless terminal 120 is operating. The components and functionalities of the in-coverage wireless terminal 120C of FIG. 7C which are essentially the same as FIG. 7A bear same reference numerals. The in-coverage wireless terminal 120C of FIG. 7C differs from FIG. 7A in showing transmission permission logic 136 as being further configured, as a precondition to permit the transmission of the synchronization sequence, to determine that a radio resource control (RRC) mode in which the in-coverage wireless terminal 120 is operating. To this end FIG. 7C shows the transmission permission logic 136 as comprising mode determination logic 158. The mode determination logic 158 of the in-coverage wireless terminal 120C of FIG. 7C checks whether the in-coverage wireless terminal 120C is operating either in the RRC_Connected mode or the RRC_Idle mode.

Figure 8C:
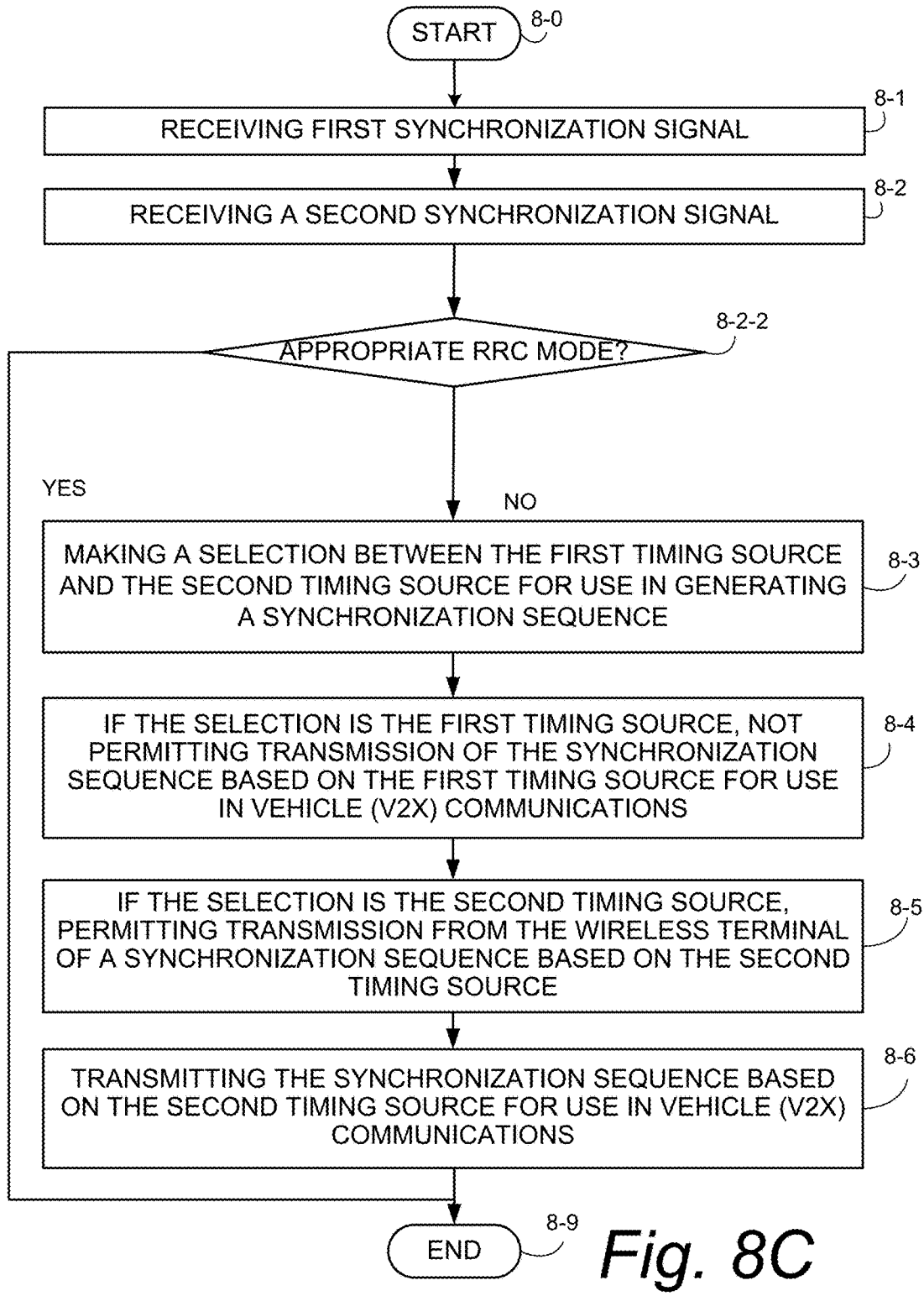
FIG. 8C is a flowchart depicting basic, example acts or steps involved in variation of the method of FIG. 8A for the example embodiment of wireless terminal shown in FIG. 7C.

FIG. 8C is a flowchart depicting basic, example acts or steps involved in variation of the method of FIG. 8A, as implemented by the in-coverage wireless terminal 120C of FIG. 7C. The acts or steps of FIG. 8C which are essentially identical to those of FIG. 8C are similarly numbered. FIG. 8C primarily differs from FIG. 8A by including act 8-2-2. Act 8-2-2 comprises checking whether the in-coverage wireless terminal 120C is operating in the RRC_Connected mode or the RRC_Idle mode. If the check of act 8-2-2 shows that the wireless terminal 120C is not operating in the RRC_Connected mode or not operating the RRC_Idle mode, execution terminates as reflected by act 8-9. Otherwise processing continues with act 8-3. For example, in one such implementation the transmission permission logic 136 may require, as a further precondition to permit the transmission of the synchronization sequence, that the wireless terminal be in RRC_CONNECTED mode and that a node of the cellular radio access network does not control synchronization sequence by the wireless terminal. In another example implementation, the transmission permission logic 136 may require, as a further precondition to permit the transmission of the synchronization sequence, that the wireless terminal be in RRC_IDLE mode.

It should be understood that, in at least some example embodiments and modes, the example embodiment and mode of FIG. 7B/FIG. 8B and the example embodiment and mode of FIG. 7C/FIG. 8C may be implemented together, e.g., by be consolidated in the same example embodiment and mode. For example, in such implementations the transmission permission logic 136 may require a certain RRC mode and cell strength measurement.

Figure 7D:
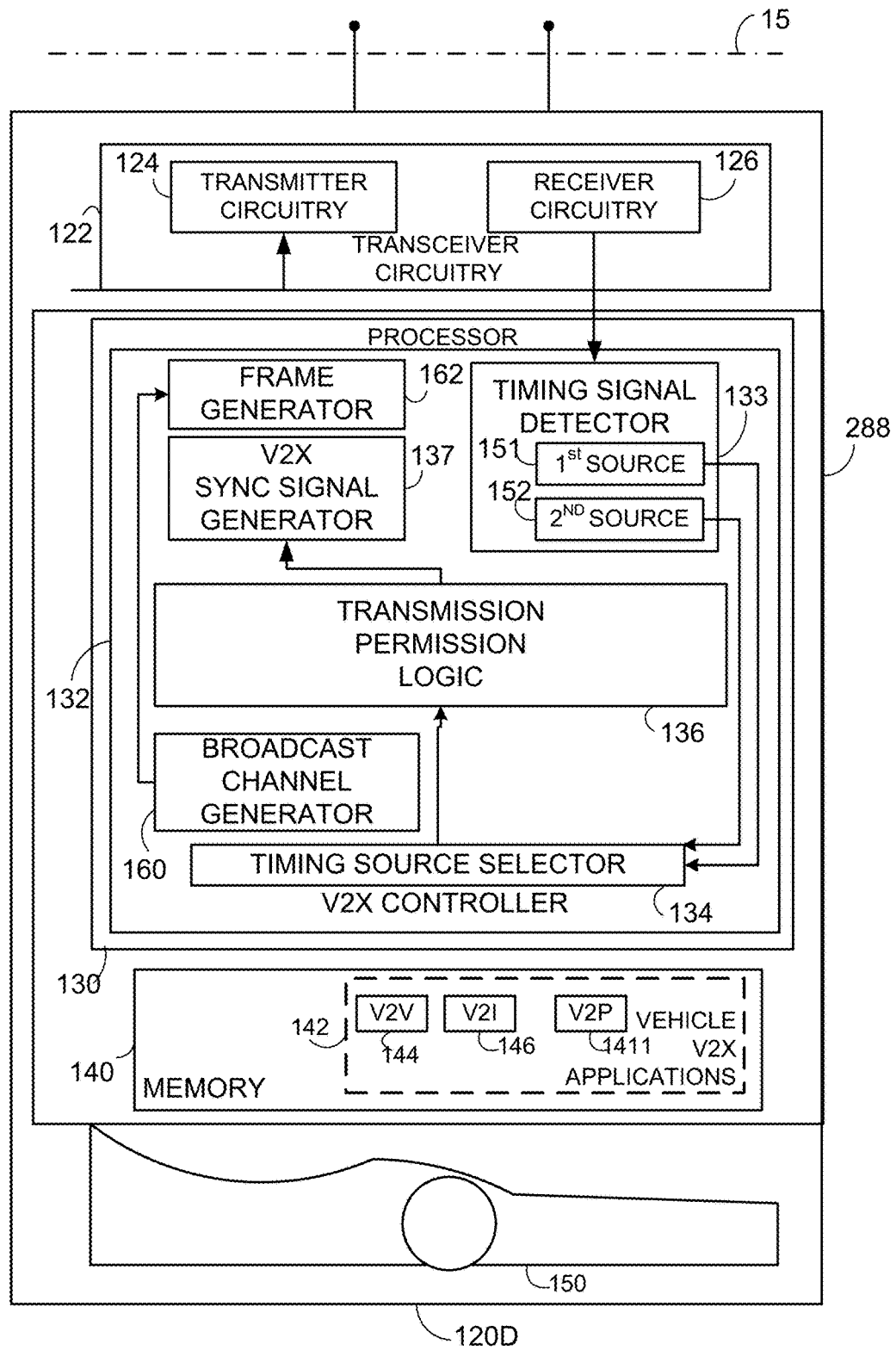
FIG. 7D is a schematic view of a wireless terminal configured to choose a timing source and to determine in accordance with the choice whether the wireless terminal should act as a (V2X) synchronization source.

FIG. 7D shows various example, representative, non-limiting components and functionalities herein pertinent of another embodiment of an in-coverage wireless terminal 120D which is configured to choose a timing source, and configured to transmit a corresponding system information block in a same subframe as the synchronization sequence. A "corresponding" system information block is a system information block which is associated with the V2X communication and carries certain information about the V2X communications. The components and functionalities of the in-coverage wireless terminal 120D of FIG. 7D which are essentially the same as FIG. 7A bear same reference numerals. The in-coverage wireless terminal 120D of FIG. 7D differs from FIG. 7A in showing system information block generator 160 and well as frame generator 162. The block generator 160 generates a system information block which, along with the synchronization sequence generated by V2X synchronization signal generator 137, is applied to the frame generator 162 for inclusion in a subframe for transmission by transmitter circuitry 124 over the vehicle (V2X) communication radio interface 15.

Figure 8D:
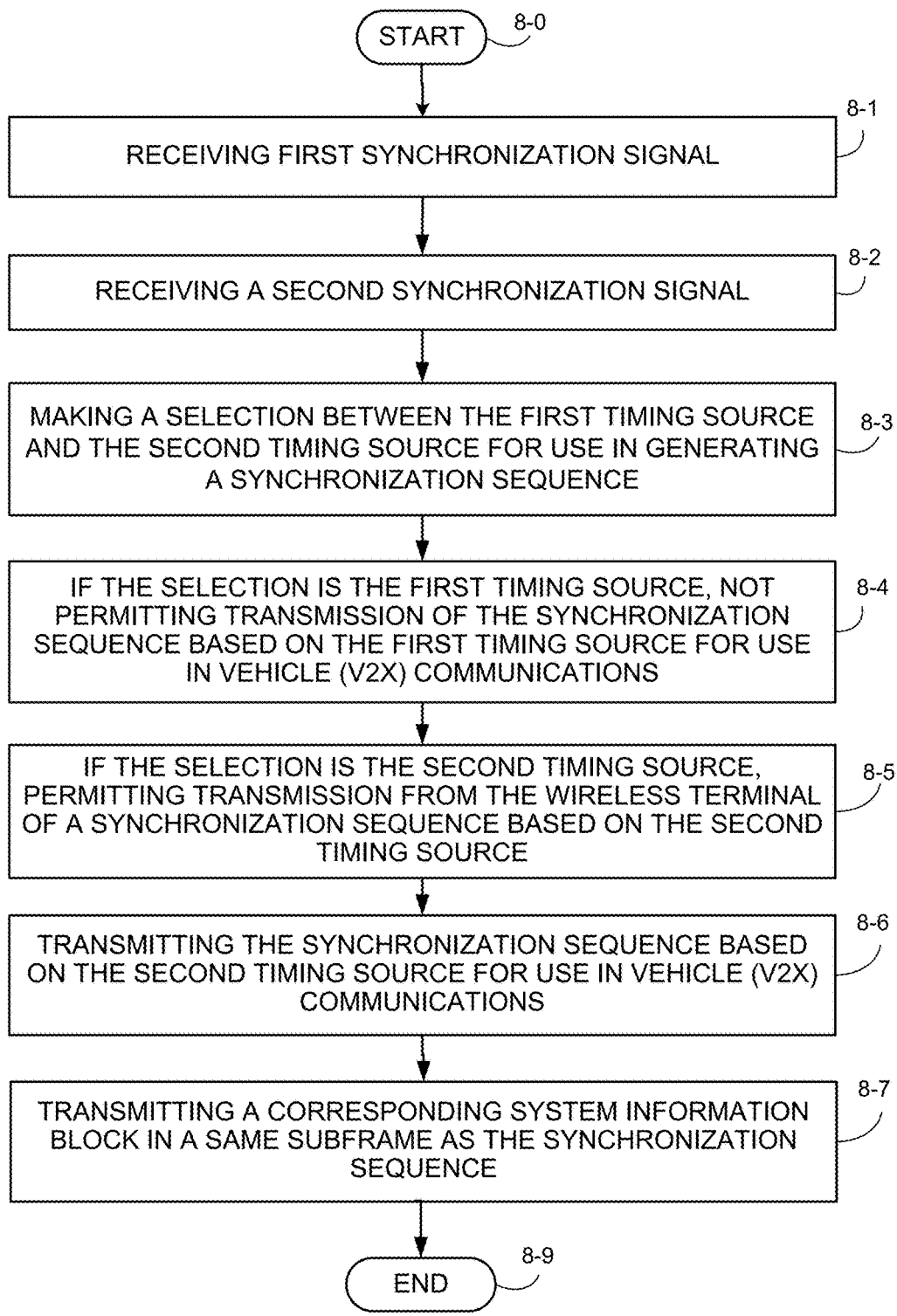
FIG. 8D is a flowchart depicting basic, example acts or steps involved in variation of the method of FIG. 8A for the example embodiment of wireless terminal shown in FIG. 7D.

FIG. 8D is a flowchart depicting basic, example acts or steps involved in variation of the method of FIG. 8A, as implemented by the in-coverage wireless terminal 120D of FIG. 7D. The acts or steps of FIG. 8D which are essentially identical to those of FIG. 8D are similarly numbered. FIG. 8D primarily differs from FIG. 8A by including act 8-8. Act 8-8 comprises the in-coverage wireless terminal 120D transmitting a corresponding system information block (generated by 160) in a same subframe as the synchronization sequence.

Figure 9A:
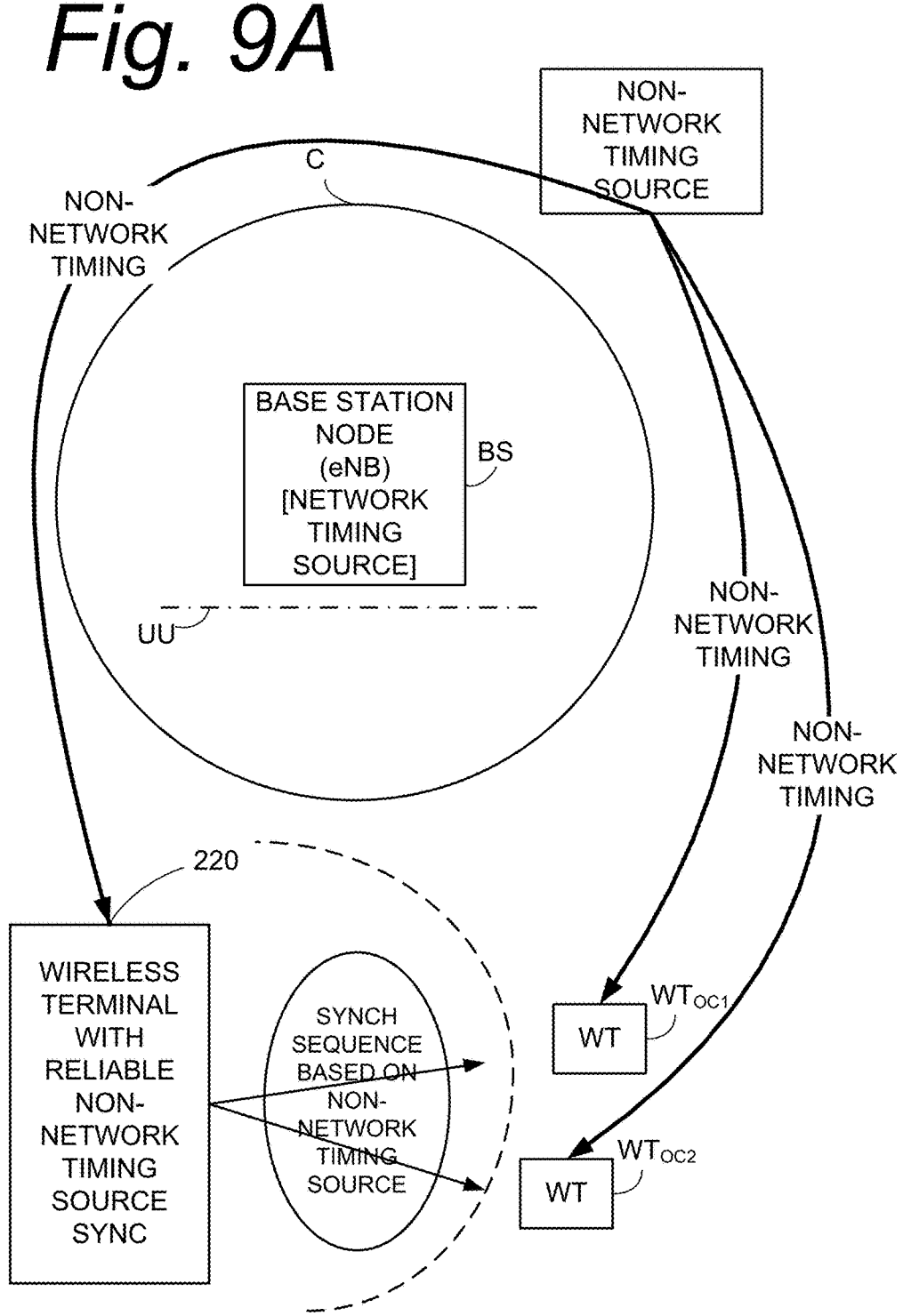

Whereas above has been described various example embodiment and modes of in-coverage wireless terminals 120, FIG. 9A and FIG. 9B illustrate an out-of-network coverage (e.g., out of coverage of the radio access network) wireless terminal 220 which attempts to act as a synchronization source for vehicle (V2X) communications. In the situation shown in FIG. 9A, the out-of-network coverage wireless terminal 220 has reliable synchronization with a non-network timing source (e.g., an external timing source which is available throughout a cellular radio access network but maintained external to the cellular radio access network) and as such transmits a synchronization sequence based on the external timing source. As understood from the foregoing, an example of an external timing source is GNSS (Global Navigation Satellite System). Moreover, as further understood from above, reliability may be determined based on comparison with a threshold value. Therefore, FIG. 9A is an example of a wireless terminal which comprises sidelink controlling circuitry (e.g., processor 232) of FIG. 10 which is configured to select a reference source and, in the case that a GNSS is reliable in comparison with a threshold value, to select GNSS as the reference source, and then to transmit a sidelink synchronization signal (SLSS) based on the reference source.

In the situation shown in FIG. 9B, the out-of-network coverage wireless terminal 220 does not have reliable synchronization with the non-network timing source and thus transmits a synchronization sequence other than the synchronization sequence based on the external timing source (e.g., a D2D synchronization sequence).

Figure 10:
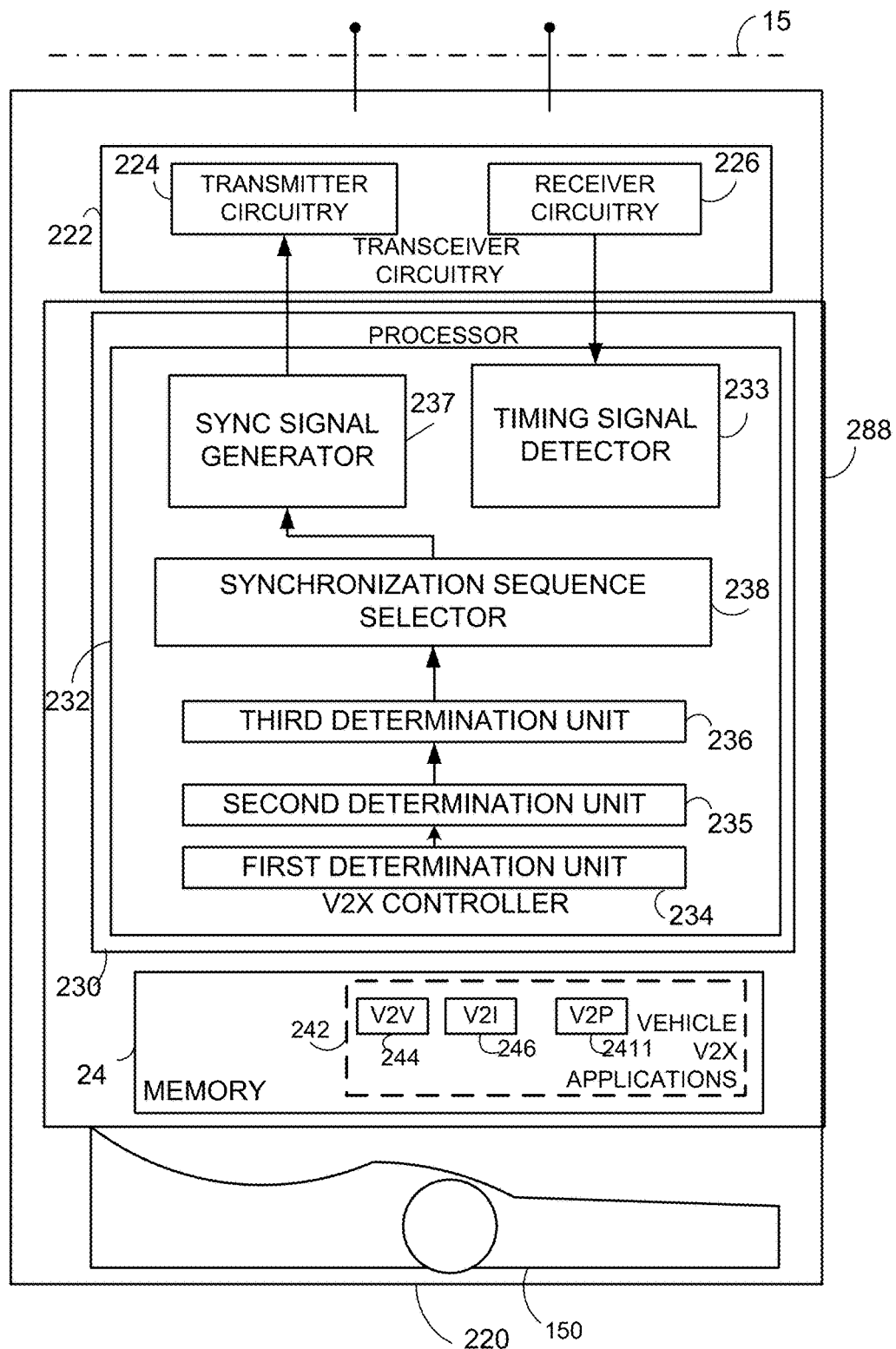
FIG. 10 is a schematic view of a generic out-of-network coverage wireless terminal attempting to act as a synchronization source in accordance with an example embodiment and mode.

FIG. 10 shows various example, representative, non-limiting components and functionalities herein pertinent of a generic out-of-coverage wireless terminal 220 which attempts to act as a (V2X) synchronization source. The wireless terminal 220 comprises transceiver circuitry 222, which in turn comprises transmitter circuitry 224 and receiver circuitry 226. The transceiver circuitry 222 includes antenna(e) for the wireless terminal 220. Transmitter circuitry 224 includes, e.g., a frame generator, amplifier(s), modulation circuitry and other conventional transmission equipment. Receiver circuitry 226 comprises, e.g., demodulation circuitry, a frame deformatter, and other conventional receiver equipment. The transceiver circuitry 222 is configured to use resources allocated for V2X communication, whether those resources be shared with sidelink direct (SLD) communications or separate and distinct for V2X communication as previously described.

The in-coverage wireless terminal 220 further comprises processor circuitry, also herein known more simply as processor 230. While processor 230 may have responsibility for operation of many aspects of wireless terminal 220 not specifically described herein, in one of its aspects processor 230 serves as a VCX controller 232 for controlling aspects of vehicle (V2X) communication. As further illustrated in FIG. 10, the synchronization controller 132 in turn comprises timing signal detector 233; first determination unit 234, second determination unit 235, third determination unit 236, synchronization signal generator 237, and synchronization sequence selector 238.

In addition to the processor circuitry 230, wireless terminal 220 also comprises memory 240 (e.g., memory circuitry) which may store an operating system and various application programs, such as vehicle (V2X) communication applications 244 (including V2I application 246, V2V (vehicle-to-vehicle) application 247 and V2P (vehicle-to-pedestrian) application 248, discussed above. The memory 240 may be any suitable type of memory, e.g., random access memory (RAM), read only memory (ROM), cache memory, processor register memory, or any combination of one or more memory types. The applications such as V2X applications 244 comprise instructions executable by processor circuitry 230 and are stored in non-transient portions of memory 240.

The out-of-coverage wireless terminal 220 further comprises user interface(s) 250. The user interfaces 250 may comprise one or more of a keyboard, audio input and output, and other user I/O devices. Only a portion of the user interfaces 250 is depicted in FIG. 9, it being understood that the user interfaces 150 may be provided on a cover or case of wireless terminal 250 and thus may visibly obscure the underlying other components shown in FIG. 9.

Figure 11:
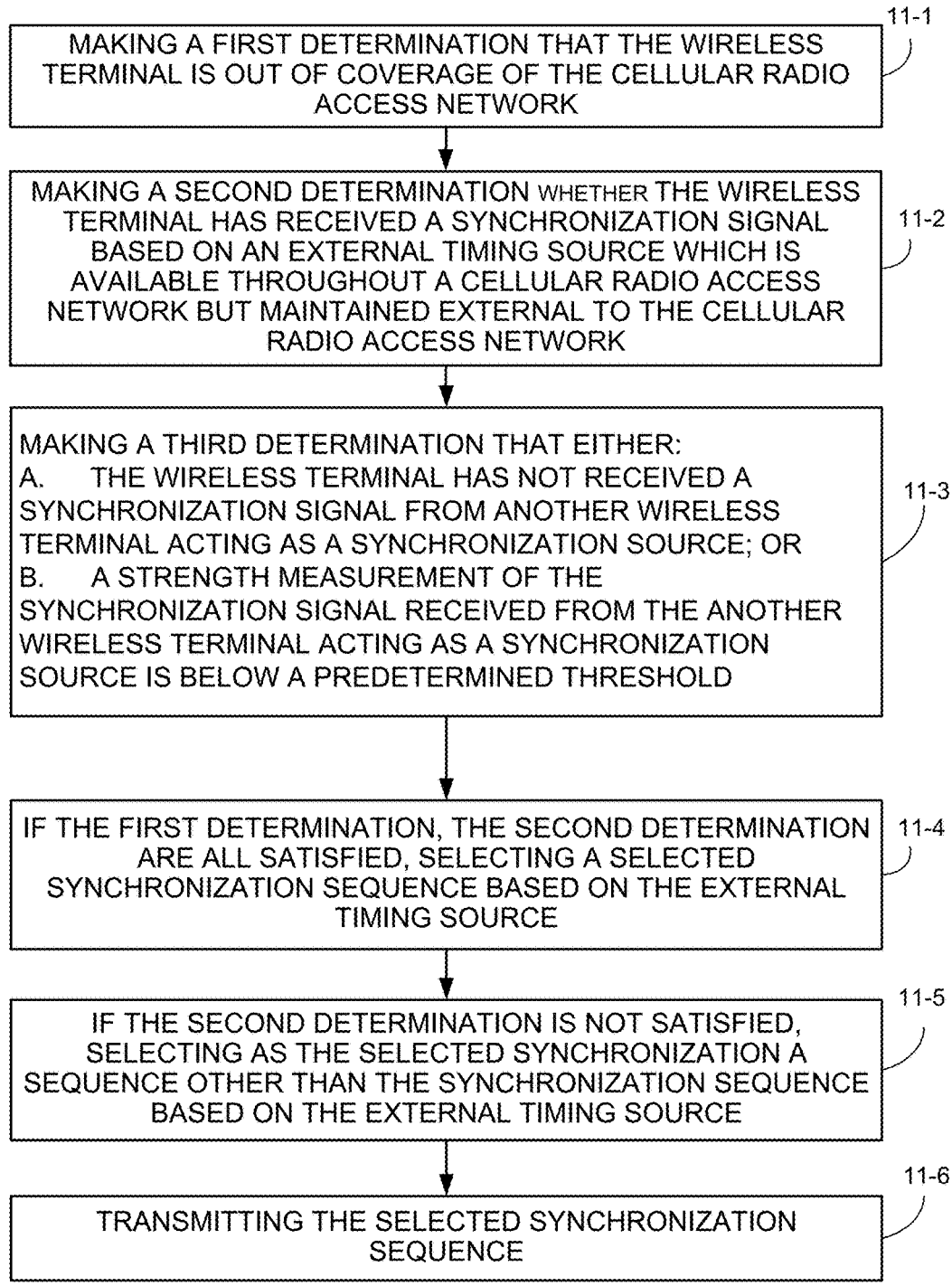
FIG. 11 is a flowchart depicting basic, example acts or steps involved in generic method of operating the generic out-of-network coverage wireless terminal of FIG. 10.

FIG. 11 is a flowchart depicting basic, example acts or steps performed by the out-of-coverage wireless terminal 220 in accordance with an example embodiment and mode. Act 11-1 comprises the first determination unit 234 making a first determination that the wireless terminal is out of coverage of the cellular radio access network. Act 11-2 comprises the second determination unit 235 making a second determination whether the wireless terminal has received (via receiver circuitry 226) a synchronization signal based on an external timing source which is available throughout a cellular radio access network but maintained external to the cellular radio access network. Act 11-3 comprises the third determination unit 236 making a third determination that either (a) the wireless terminal has not received a synchronization signal from another wireless terminal acting as a synchronization source; or (b) a strength measurement of the synchronization signal received from the another wireless terminal acting as a synchronization source is below a predetermined threshold. Act 11-4 comprises, if the first determination and the second determination are both satisfied, the synchronization sequence selector 238 selecting a selected synchronization sequence based on the external timing source. Act 11-5 comprises, if the second determination is not satisfied, the synchronization sequence selector 238 selecting as the selected synchronization sequence a synchronization sequence other than the synchronization sequence based on the external timing source. For example, as act 11-5 the synchronization sequence selector 238 may select a synchronization sequence according to sidelink direct (SLD or DD) protocol as defined in 3GPP 36.661. Act 11-6 comprises the transmitter circuitry 224 transmitting the selected synchronization sequence.

It was mentioned above that the timing source selectors are configured to make a choice of timing source from among either the network timing source or the non-cellular radio access network timing source. In situations in which a timing signal or synchronization signal is received from a network device such as another wireless terminal which has obtained its timing from a "non-cellular radio access network source", such another wireless terminal may itself be considered a non-cellular radio access network timing source and thus the wireless terminal receiving a timing signal therefrom may decide not to transit a synchronization sequence based on such timing signal (since it was ultimately derived from the non-cellular radio access network timing source). On the other hand, if a network device such as a wireless terminal uses its own clock as an independent timing source, apart from an network timing or non-cellular radio access network timing, then a wireless terminal receiving such independent timing signal may grant itself permission to transmit a synchronization sequence based on such independent timing source.

Two or more aspects of the technology disclosed herein may be combined in a single wireless terminal. For example, the components, functionalities, and capabilities of wireless terminal 20, the in-coverage wireless terminals 120, and the out-of-coverage wireless terminals 220 may all be realized in a single wireless terminal. Such is understood to be the case since the wireless terminal may at sometimes be in coverage of the radio access network (and thereby function as one of the in-coverage wireless terminals 120), but at other times may be out-of-coverage (and thereby function as the in-coverage wireless terminal 220). Moreover, two or more of the variations of the preceding methods may be combined for execution by a single wireless terminal.

In the above regard, it should be understood that the processors described herein, whether in combined functionality or otherwise, in enabling the wireless terminals to operate as described herein, may execute a computer program or computer program product comprising coded instructions stored on non-transient memory, e.g., memory 140. Table 2 below describes, e.g., an algorithm that may be comprise a particular implementation of the computer program, and moreover uses some V2X terminology:

TABLE 2

A UE shall, when transmitting V2X communication and when the following conditions are met:
If the velocity of the UE is lower than syncRefMaxVelocity (This condition is one alternative, the other alternative is there is no velocity condition limitation, in other word, no this "0" step)
    ALT 1: V2X and D2D are only distinguishable in non-access stratum (NAS) layers, in other words, the timing of V2X and D2D shouldn't be distinguished in AS layer synchronization procedures,
        1> if in coverage on the frequency used for V2X communications:
            2>if the UE is in RRC_CONNECTED; and networkControlledSyncTx (this information element means all synchronization signal transmission in coverage are still totally controlled by eNB if the UE can receive this information from eNB. If this information indicates "off", then no matter the timing the UE is used and the situation around the UE, the UE shall not transmit synchronization signal) is not configured; and
        syncTxThreshIC is included in SystemInformationBlockType18, or SystemInformationBlockType18 with modification for new 3GPP release applicable for V2X, or new defined SIB dedicated for V2X (in the latter two cases, without particular explanation, the information elements (IEs), e.g., "networkControlledSyncTx" and "syncTxThreshIC", mentioned in this part have the same meaning as those in the current specification); and the
        RSRP measurement of the cell chosen for V2X transmission is below the value of syncTxThreshIC; and
        [Alt 1.1]: the UE is using E-UTRAN timing, (The motivation of this alternative is only E-UTRAN timing needs to be extended to out of coverage, because both in coverage and out of coverage can have GNSS coverage)
        [Alt 1.2]: no matter the UE is using E-UTRAN timing or GNSS timing, (The motivation of this alternative is the eNB nevertheless wants to extend in coverage timing to out of coverage for communications between in coverage and out of coverage UEs, no matter the eNB configures the UEs in its coverage to use E-UTRAN timing or GNSS timing, which is up to eNB)

Figure 12:
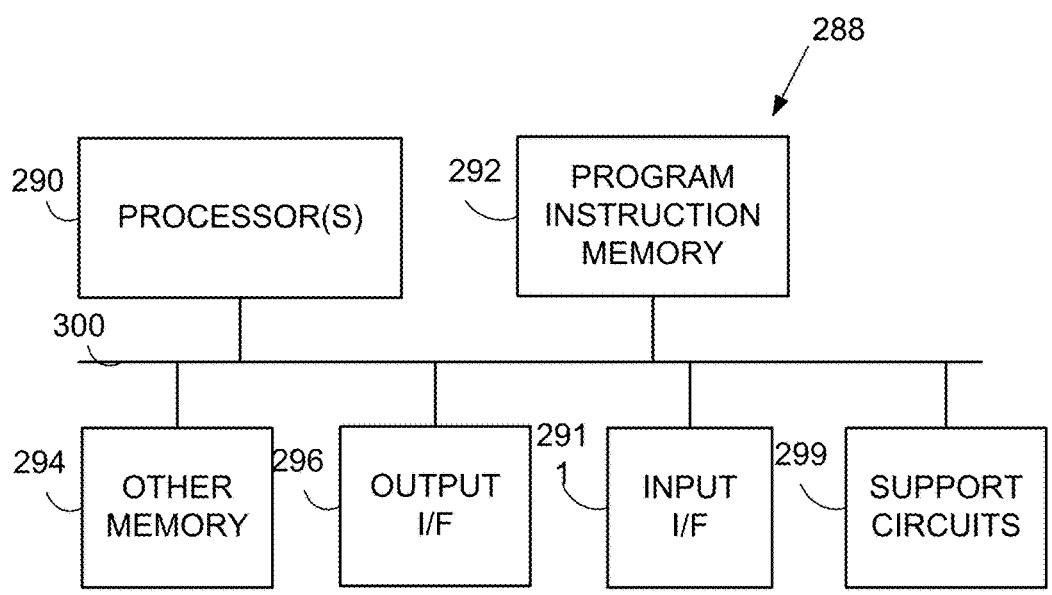
FIG. 12 is a diagrammatic view showing example elements comprising electronic machinery which may comprise a wireless terminal according to an example embodiment and mode.

TABLE 2-continued (The above two alternatives lead to different types of SLSS sequence transmissions
in step (3) )
or
2>if the UE is in RRC_IDLE; and syncTxThreshIC is included in
SystemInformationBlockType18 or SystemInformationBlockType18 with
modification for new 3GPP release applicable for V2X, or new defined SIB
dedicated for V2X; and the RSRP measurement of the cell chosen for V2X
transmission is below the value of syncTxThreshIC; and
[Alt 1.1]: the UE is using E-UTRAN timing,
[Alt 1.2]: no matter the UE is using E-UTRAN timing or GNSS timing,
3>transmit SLSS or SLSS with modification for new 3GPP release applicable for
V2X, or new defined SLSS dedicated for V2X;
[Alt 1.1]: the SLSS is from the SLSS set which corresponds to E-UTRAN
timing.
[Alt 1.2]: the SLSS is from the SLSS set which corresponds to the timing the
UE uses.
3>transmit the corresponding MasterInformationBlock-SL message, or
MasterInformationBlock-SL message with modification for new 3GPP release
applicable for V2X, or new defined MasterInformationBlock-SL message
dedicated for V2X, in the same subframe as SLSS;
1>else (i.e. out of coverage):
2>if syncTxThreshOoC is included in the preconfigured sidelink parameters (i.e. SL-
Preconfiguration defined in 9.3); and the UE has no selected SyncRef UE or the S-
RSRP measurement result of the selected SyncRef UE is below the value of
syncTxThreshOoC; and
[Alt 2.1]: the UE has reliable GNSS synchronization,
[Alt 2.2]: the UE has no reliable GNSS synchronization (reliability definition such
as synchronization reliability factor is discussed previously),
3>transmit SLSS or SLSS with modification for new 3GPP release applicable for
V2X, or new defined SLSS dedicated for V2X;
[Alt 2.1]: the SLSS is from the SLSS set which corresponds to GNSS.
[Alt 2.2]: the SLSS is selected according to D2D's synchronization signal
sequence selection in TS 36.331. (For convenience, these are listed below:
else (i.e. no SyncRef UE selected):
randomly select, using a uniform distribution, an SLSSID from the set of
sequences defined for out of coverage, see TS 36.211 [21];
select the subframe in which to transmit the SLSS according to the
syncOffsetIndicator1 or syncOffsetIndicator2 (arbitrary selection between these)
included in the preconfigured sidelink parameters (i.e. preconfigSync in SL-
Preconfiguration defined in 9.3);
)
3>transmit the MasterInformationBlock-SL message, or MasterInformationBlock-
SL message with modification for new 3GPP release applicable for V2X, or new
defined MasterInformationBlock-SL message dedicated for V2X, in the same
subframe as SLSS;
ALT 2: Because of different service types and different subscriber groups, the D2D timing
has no relationship with V2X timing, in other words, V2X timing doesn't necessarily mean
D2D timing. This alternative is similar to ALT 2 except that the UE has to consider whether
the synchronization signal belong to V2X service; this also only applies to out of coverage
scenario.
1>else (i.e. out of coverage):
2>if syncTxThreshOoC is included in the preconfigured sidelink parameters (i.e. SL-
Preconfiguration defined in 9.3); and the UE has no selected V2X SyncRef UE or
the S-RSRP measurement result of the selected SyncRef UE which belongs to V2X
service is below the value of syncTxThreshOoC; and
[Alt 2.1]: the UE has reliable GNSS synchronization,
[Alt 2.2]: the UE has no reliable GNSS synchronization (reliability definition is in
Topic 1 of this patent),
3>transmit SLSS or SLSS with modification for new 3GPP release applicable for
V2X, or new defined SLSS dedicated for V2X;
[Alt 2.1]: the SLSS is from the SLSS set which corresponds to GNSS.
[Alt 2.2]: the SLSS is selected according to D2D's synchronization signal
sequence selection in TS 36.331. (For convenience, these are listed below:
else (i.e. no SyncRef UE selected):
randomly select, using a uniform distribution, an SLSSID from the set of
sequences defined for out of coverage and V2X service;
select the subframe in which to transmit the SLSS according to the
syncOffsetIndicator1 or syncOffsetIndicator2 (arbitrary selection between these)
included in the preconfigured sidelink parameters (i.e. preconfigSync in SL-
Preconfiguration defined in 9.3);
)
3>    transmit the MasterInformationBlock-SL message, or MasterInformationBlock-
SL message with modification for new 3GPP release applicable for V2X, or new defined
MasterInformationBlock-SL message dedicated for V2X, in the same subframe as SLSS;

Certain units and functionalities of wireless terminal 40 framed by broken line are, in an example embodiment, implemented by terminal electronic machinery 88. FIG. 12 shows an example of such electronic machinery 88 as comprising one or more processors 290, program instruction memory 292; other memory 294 (e.g., RAM, cache, etc.); input/output interfaces 296; peripheral interfaces 298; support circuits 299; and busses 300 for communication between the aforementioned units. The processor(s) 290 may comprise the processor circuitries described herein, for example.

The memory 294, or computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory 40 or memory 140 shown in FIG. 4A and FIG. 7A. The support circuits 299 are coupled to the processors 290 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminal 40 used in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications.

As one of its aspects, the technology disclosed herein concerns a wireless terminal configured for use in vehicle (V2X) communications. The wireless terminal comprises a receiver, processor circuitry, and a transmitter. The receiver is configured to receive a timing signal from a timing source. The processor circuitry configured to obtain a synchronization reliability factor; make a comparison of the synchronization reliability factor with a threshold value; and use a result of the comparison to make a determination whether to permit transmission of a synchronization signal based on the received timing signal. The transmitter is configured, when permitted in accordance with the determination, to transmit the synchronization signal over a frequency used for vehicle (V2X) communications.

In an example embodiment and mode the threshold value is preconfigured at the wireless terminal.

In an example embodiment and mode the threshold value is received by the wireless terminal from a cellular radio access network.

In an example embodiment and mode the threshold value is received by the wireless terminal in a system information block.

In an example embodiment and mode the timing source is a network timing source, and wherein the synchronization reliability factor is a velocity value for the wireless terminal.

In an example embodiment and mode the velocity threshold value is set in dependence upon Doppler shift affecting accuracy of timing of the synchronization signal.

In an example embodiment and mode the timing source is a non-cellular radio access network source. In an example implementation the timing source is a satellite system.

In an example embodiment and mode the processor circuitry is further configured to make the determination to transmit the synchronization signal in dependence on a strength measurement of the timing signal from the non-cellular radio access network source.

In an example embodiment and mode the processor circuitry is further configured to make the determination to transmit the synchronization signal in dependence on the strength measurement of the timing signal exceeding a strength minimum threshold value by a hysteresis value.

In another of its aspects the technology disclosed herein concerns a method of operating a wireless terminal configured for use in vehicle (V2X) communications. embodiment and mode the method comprises: receiving a timing signal from a timing source and using processor circuitry to:
- obtain a synchronization reliability factor for the wireless terminal;
- make a comparison of the synchronization reliability factor with a threshold value;
- use a result of the comparison to make a determination whether to permit transmission of a synchronization signal based on the received timing signal; and
- when permitted in accordance with the determination, transmitting the synchronization signal over a frequency used for vehicle (V2X) communications.

In an example embodiment and mode the threshold value is preconfigured at the wireless terminal.

In an example embodiment and mode the wireless terminal receives the threshold value from a cellular radio access network.

In an example embodiment and mode the threshold value is received by the wireless terminal in a system information block.

In an example embodiment and mode the timing source is a network timing source, and wherein the synchronization reliability factor is a velocity value for the wireless terminal.

In an example embodiment and mode the velocity threshold value is set in dependence upon Doppler shift affecting accuracy of timing of the synchronization signal.

In an example embodiment and mode the timing source is a non-radio access network source. In an example implementation the timing source is a satellite system.

In an example embodiment and mode the method further comprises using the processing circuitry to make the determination to transmit the synchronization signal in dependence on a strength measurement of the timing signal from the non-radio access network source.

In an example embodiment and mode the method further comprises using the processor circuitry to make the determination to transmit the synchronization signal in dependence on the strength measurement of the timing signal exceeding a strength minimum threshold value by a hysteresis value.

In another of its aspects the technology disclosed herein concerns wireless terminal configured for use in vehicle (V2X) communications comprising receiver circuitry; processor circuitry, and a transmitter. The receiver circuitry is configured to receive: a first synchronization signal based on a first timing source which is available throughout a cellular radio access network but maintained external to the cellular radio access network, and a second synchronization signal based on a second timing source maintained by the cellular radio access network. The processor circuitry is configured to make a selection between the first timing source and the second timing source. If the selection is the second timing source, the processor circuitry permits transmission from the wireless terminal of a synchronization sequence based on the second timing source. If the selection is the first timing source, the processor circuitry does not permit transmission of a synchronization sequence. The transmitter is configured, when permitted, to transmit the synchronization sequence based on the second timing source for use in vehicle (V2X) communications.

In an example embodiment and mode the transmitter is configured, when permitted, to transmit a corresponding system information block in a same subframe as the synchronization sequence.

In an example embodiment and mode, as a precondition to permit the transmission of the synchronization sequence the processing circuitry is further configured to determine that a strength measurement of a cell of the cellular radio access network chosen for transmission of the synchronization sequence is below a predetermined threshold.

In an example embodiment and mode the processing circuitry is further configured to obtain the predetermined threshold from a system information block broadcasted from the cellular radio access network.

In an example embodiment and mode the predetermined threshold is an information element syncTxThreshIC.

In an example embodiment and mode as a further precondition to permit the transmission of the synchronization sequence the processing circuitry is further configured to determine that the wireless terminal is in RRC_CONNECTED mode and that a node of the cellular radio access network does not control synchronization sequence by the wireless terminal.

In an example embodiment and mode the predetermined threshold is an information element syncTxThreshIC.

In an example embodiment and mode as a further precondition to permit the transmission of the synchronization sequence the processing circuitry is further configured to determine that the wireless terminal is in RRC_IDLE mode.

In an example embodiment and mode as a precondition to permit the transmission of the synchronization sequence the processing circuitry is further configured to determine that velocity of the wireless terminal is below a predetermined velocity threshold.

In another of its aspects the technology disclosed herein concerns a method of operating a wireless terminal configured for use in vehicle (V2X) communications. The method comprises receiving: a first synchronization signal based on a first timing source which is available throughout a cellular radio access network but maintained external to the cellular radio access network, and a second synchronization signal based on a second timing source maintained by the cellular radio access network. The method further comprises using processor circuitry to:
- make a selection between the first timing source and the second timing source;
- if the selection is the first timing source, to not permit transmission of the synchronization sequence based on the first timing source for use in vehicle (V2X) communications;
- if the selection is the second timing source, to permit transmission from the wireless terminal of a synchronization sequence based on the second timing source.

In an example embodiment and mode the method further comprises, if the selection is the second timing source, transmitting the synchronization sequence based on the second timing source for use in vehicle (V2X) communications.

In an example embodiment and mode the method further comprises transmitting a corresponding system information block in a same subframe as the synchronization sequence.

In an example embodiment and mode the method further comprises as a precondition to permit the transmission of the synchronization sequence using the processing circuitry to determine that a strength measurement of a cell of the cellular radio access network chosen for transmission of the synchronization sequence is below a predetermined threshold.

In an example embodiment and mode the method further comprises obtaining the predetermined threshold from a system information block broadcasted from the cellular radio access network.

In an example embodiment and mode the predetermined threshold is an information element syncTxThreshIC.

In an example embodiment and mode the method further comprises as a further precondition to permit the transmission of the synchronization sequence using the processing circuitry to determine that the wireless terminal is in RRC_CONNECTED mode and that a node of the cellular radio access network does not control synchronization sequence by the wireless terminal.

In an example embodiment and mode the predetermined threshold is an information element syncTxThreshIC.

In an example embodiment and mode the method further comprises as a further precondition to permit the transmission of the synchronization sequence using the processing circuitry to determine that the wireless terminal is in RRC_IDLE mode.

In an example embodiment and mode the method further comprises as a precondition to permit the transmission of the synchronization sequence using the processing circuitry to determine that velocity of the wireless terminal is below a predetermined velocity threshold.

In another of its aspects the technology disclosed herein concerns a wireless terminal configured for use in vehicle (V2X) communications comprising: receiver circuitry; processor circuitry; and transmitter circuitry. The receiver circuitry is configured to receive a synchronization signal based on an external timing source which is available throughout a cellular radio access network but maintained external to the cellular radio access network. The processor circuitry is configured
(1) to make a first determination that the wireless terminal is out of coverage of the cellular radio access network;
(2) to make a second determination that the wireless terminal has received a synchronization signal based on an external timing source which is available throughout a cellular radio access network but maintained external to the cellular radio access network;
(3) make a third determination that either:
   a. the wireless terminal has not received a synchronization signal from another wireless terminal acting as a synchronization source; or
   b. a strength measurement of the synchronization signal received from the another wireless terminal acting as a synchronization source is below a predetermined threshold;
if the first determination and the second determination are both satisfied, select a selected synchronization sequence based on the external timing source;
if the second determination is not satisfied, to select as the selected synchronization sequence other than the synchronization sequence based on the external timing source. The transmitter circuitry is configured to transmit the selected synchronization sequence.

In another of its aspects the technology disclosed herein concerns a method of operating a wireless terminal. In an example basic embodiment and mode the method comprises:

(1) making a first determination that the wireless terminal is out of coverage of the cellular radio access network;
(2) making a second determination whether the wireless terminal has received a synchronization signal based on an external timing source which is available throughout a cellular radio access network but maintained external to the cellular radio access network;
(3) making a third determination that either:
   a. the wireless terminal has not received a synchronization signal from another wireless terminal acting as a synchronization source; or
   b. a strength measurement of the synchronization signal received from the another wireless terminal acting as a synchronization source is below a predetermined threshold;
(4) if the first determination and the second determination are both satisfied, selecting a selected synchronization sequence based on the external timing source;
(5) if the second determination is not satisfied, selecting as the selected synchronization sequence other than the synchronization sequence based on the external timing source; and
(6) transmitting the selected synchronization sequence.

In another of its aspects the technology disclosed herein concerns a wireless terminal configured for use in vehicle (V2X) communications comprising: receiver circuitry; processor circuitry; and transmitter circuitry. The receiver circuitry is configured to receive a timing signal from a timing source. The processor is circuitry configured to make a determination whether to use the timing source as a reference source based on a comparison with a threshold value. Transmitter circuitry is configured, when permitted in accordance with the determination, to transmit the synchronization signal over a frequency used for vehicle (V2X) communications. In an example embodiment and mode, the timing source is an external or non-cellular network timing source such as GNSS (Global Navigation Satellite System) timing source. In an example embodiment and mode, the processor circuitry selects the timing source from among plural timing sources.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wireless terminal comprising:
sidelink controlling circuitry configured to select a reference source; and
transmitting circuitry configured to transmit a sidelink synchronization signal (SLSS) derived from the reference source;
wherein in a case that
the wireless terminal is out of coverage on a frequency used for sidelink communication,
the wireless terminal receives Global Navigation Satellite System ("GNSS"), and
the GNSS is reliable according to a comparison with a threshold value,
a timing acquired from the GNSS is selected as the reference source.

2. A method of operating a wireless terminal comprising:
selecting a reference source;
transmitting a sidelink synchronization signal ("SLSS") derived from the reference source;
wherein in a case that
the wireless terminal is out of coverage on a frequency used for sidelink communication,
the wireless terminal receives Global Navigation Satellite System ("GNSS"), and
the GNSS is reliable according to a comparison with a threshold value, a timing acquired from the GNSS is selected as the reference source.

* * * * *